US 6,538,624 B1

(12) United States Patent
Karasawa et al.

(10) Patent No.: US 6,538,624 B1
(45) Date of Patent: Mar. 25, 2003

(54) HEAD-MOUNTED IMAGE DISPLAY APPARATUS

(75) Inventors: Joji Karasawa, Suwa (JP); Shoichi Ishizawa, Suwa (JP); Shoichi Uchiyama, Suwa (JP); Yoko Miyazawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/547,980

(22) Filed: Apr. 12, 2000

Related U.S. Application Data

(62) Division of application No. 08/970,544, filed on Nov. 14, 1997, which is a continuation of application No. 08/416,893, filed as application No. PCT/JP94/01248 on Jul. 29, 1994, now Pat. No. 5,739,893.

(30) Foreign Application Priority Data

| Aug. 20, 1993 | (JP) | 5-206393 |
| Sep. 1, 1993 | (JP) | 5-217552 |
| Sep. 17, 1993 | (JP) | 5-231963 |
| Sep. 29, 1993 | (JP) | 5-242791 |

(51) Int. Cl.[7] ............................... G09G 5/00; H04N 5/64
(52) U.S. Cl. .............................. 345/8; 345/9; 359/631; 359/632; 351/158
(58) Field of Search .......................... 345/7–9; 348/115, 348/42, 43, 52, 53; 351/156, 159, 160 R; 359/480–482, 630–632, 646, 462

(56) References Cited

U.S. PATENT DOCUMENTS

| 2,970,593 A | 2/1961 | Seeler | 425/471 |
| 3,737,567 A | 6/1973 | Kratomi | 348/56 |
| 3,761,959 A | 10/1973 | Dunning | 2/413 |

(List continued on next page.)

FOREIGN PATENT DOCUMENTS

| CA | 1 116 801 | 1/1982 |
| EP | 0 252 200 | 1/1988 |
| EP | 0 344 881 | 12/1989 |

(List continued on next page.)

OTHER PUBLICATIONS

No. 571, Nikkei Electronics published Jan. 4, 1994, Head–mounted Image Display Apparatus by Sony (prototype).
Nikkei Electronics Jan. 2, 1984, pp. 158–177.
"Machine A Ecrire Electronique Compacte Canon, AP150, Mode D'Emploi" 1985, Canon, France XP002019816, pp 15–18 & pp 47–48.
ICL Technical Journal, vol. 7, No. 2, Nov. 1990, Oxford, GB, pp 384–411.
Optical Engineering vol. 13, No. 4 Jul. 1974–Aug. 1974. pp 339–342.
EPO Communication re: Application No. EP 98 20 2807 (Search report).

Primary Examiner—Lun-Yi Lao
(74) Attorney, Agent, or Firm—Mark P. Watson

(57) ABSTRACT

In a head-mounted image display apparatus (1) for viewing images on a liquid crystal display means virtually enlarged by an enlarging lens while worn on the head, main apparatus (10) comprises a front case (2), which is positioned at the frontal region side when said main apparatus is worn on the head, and a back case (3), which is positioned at the occipital region. In addition, an air bag (8), which inflates to cause the frontal region to contact a buffer pad affixed to the inside surface of the front case (2), is provided on the inside of the back case (3). The back case (3) is able to rotate on connecting member 5 to the front case (2). Adjustment mechanisms for moving the optical system in the pupil distance direction and in the direction of the optical axes is disposed inside main apparatus (10), and the knobs therefor are centrally disposed on the front of main apparatus (10).

3 Claims, 19 Drawing Sheets

U.S. PATENT DOCUMENTS

| | | | | |
|---|---|---|---|---|
| 3,923,370 | A | 12/1975 | Mostrom | 359/630 |
| 4,081,209 | A | 3/1978 | Heller et al. | 359/631 |
| 4,231,117 | A | 11/1980 | Aileo | 2/420 |
| 4,636,866 | A | 1/1987 | Hattori | 348/794 |
| 4,805,988 | A | 2/1989 | Dones | 359/471 |
| 4,997,263 | A | 3/1991 | Cohen et al. | 349/11 |
| 5,005,213 | A | 4/1991 | Hanson et al. | 359/146 |
| 5,015,188 | A | 5/1991 | Pellosie, Jr. et al. | 434/38 |
| 5,034,809 | A | 7/1991 | Katoh | 348/53 |
| 5,050,240 | A | 9/1991 | Sayre | 2/6.2 |
| 5,130,794 | A | 7/1992 | Ritchey | 348/39 |
| 5,162,828 | A | 11/1992 | Furness et al. | 353/122 |
| 5,175,889 | A | 1/1993 | Infusino | 2/413 |
| 5,214,466 | A | 5/1993 | Nagano et al. | 396/51 |
| 5,266,930 | A * | 11/1993 | Ichikawa et al. | 348/8 |
| 5,414,544 | A | 5/1995 | Aoyagi et al. | 349/13 |
| 5,440,197 | A | 8/1995 | Gleckman | 313/110 |
| 5,463,428 | A | 10/1995 | Lipton et al. | 351/158 |
| 5,486,841 | A * | 1/1996 | Hara et al. | 345/8 |
| 5,543,816 | A | 8/1996 | Heacock | 345/8 |
| 5,594,573 | A | 1/1997 | August | 359/13 |
| 5,646,753 | A | 7/1997 | Takatori et al. | 359/15 |
| 5,699,133 | A | 12/1997 | Furuta | 349/13 |
| 5,719,588 | A | 2/1998 | Johnson | 345/8 |
| 5,751,383 | A | 5/1998 | Yamanaka | 349/13 |
| 5,812,099 | A * | 9/1998 | Spector | 348/8 |

FOREIGN PATENT DOCUMENTS

| | | |
|---|---|---|
| EP | 0 395 570 | 10/1990 |
| EP | 0 438 362 | 7/1991 |
| EP | 0 460 983 | 12/1991 |
| EP | 0 479 422 | 4/1992 |
| EP | 0 479 605 | 4/1992 |
| EP | 0 537 945 | 4/1993 |
| EP | 0 575 257 | 12/1993 |
| EP | 0 592 318 | 4/1994 |
| FR | 2 679 693 | 1/1993 |
| FR | 2 681 702 | 3/1993 |
| GB | 26 265 | 5/1912 |
| GB | 1 264 343 | 2/1972 |
| GB | 2 206 421 | 1/1989 |
| GB | 2 259 213 | 3/1993 |
| GB | 2 278 692 | 12/1994 |
| JP | 1-133479 | 5/1989 |
| JP | 2-1723 | 1/1990 |
| JP | 4-22358 | 1/1992 |
| JP | 5-48991 | 2/1993 |
| JP | 5-100192 | 4/1993 |
| JP | 5-183838 | 7/1993 |
| JP | 5-328256 | 12/1993 |
| JP | 2526226 | 5/1994 |
| JP | 6-141260 | 5/1994 |
| WO | WO 91/04508 | 4/1991 |
| WO | WO 92/03756 | 3/1992 |
| WO | WO 93/01683 | 1/1993 |

* cited by examiner

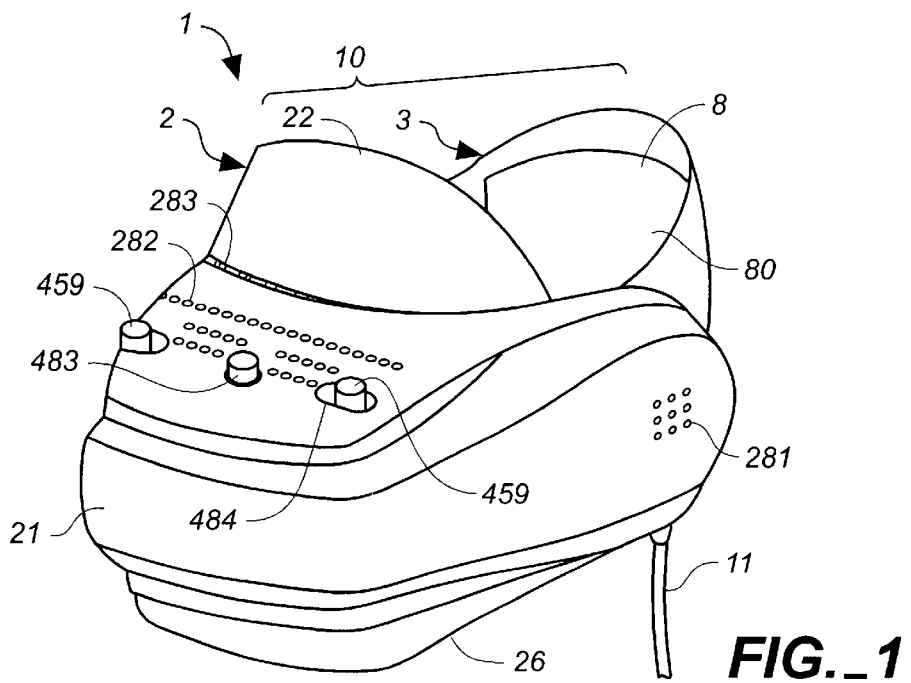
FIG._1
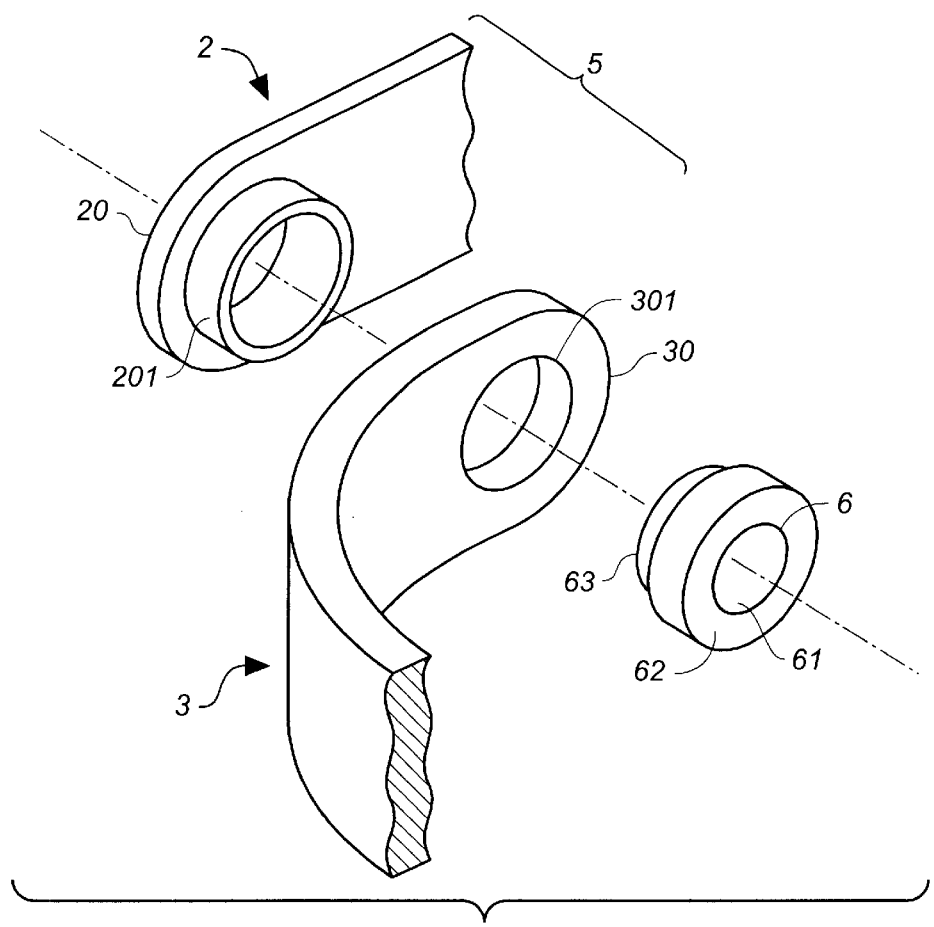
FIG._5

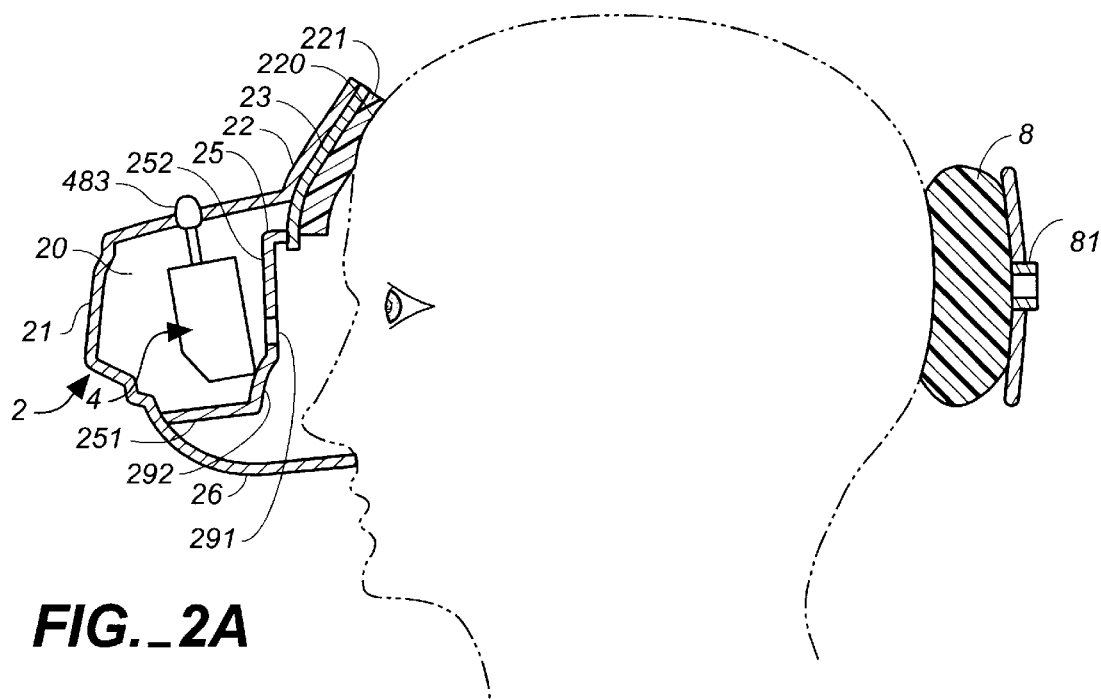
FIG._2A
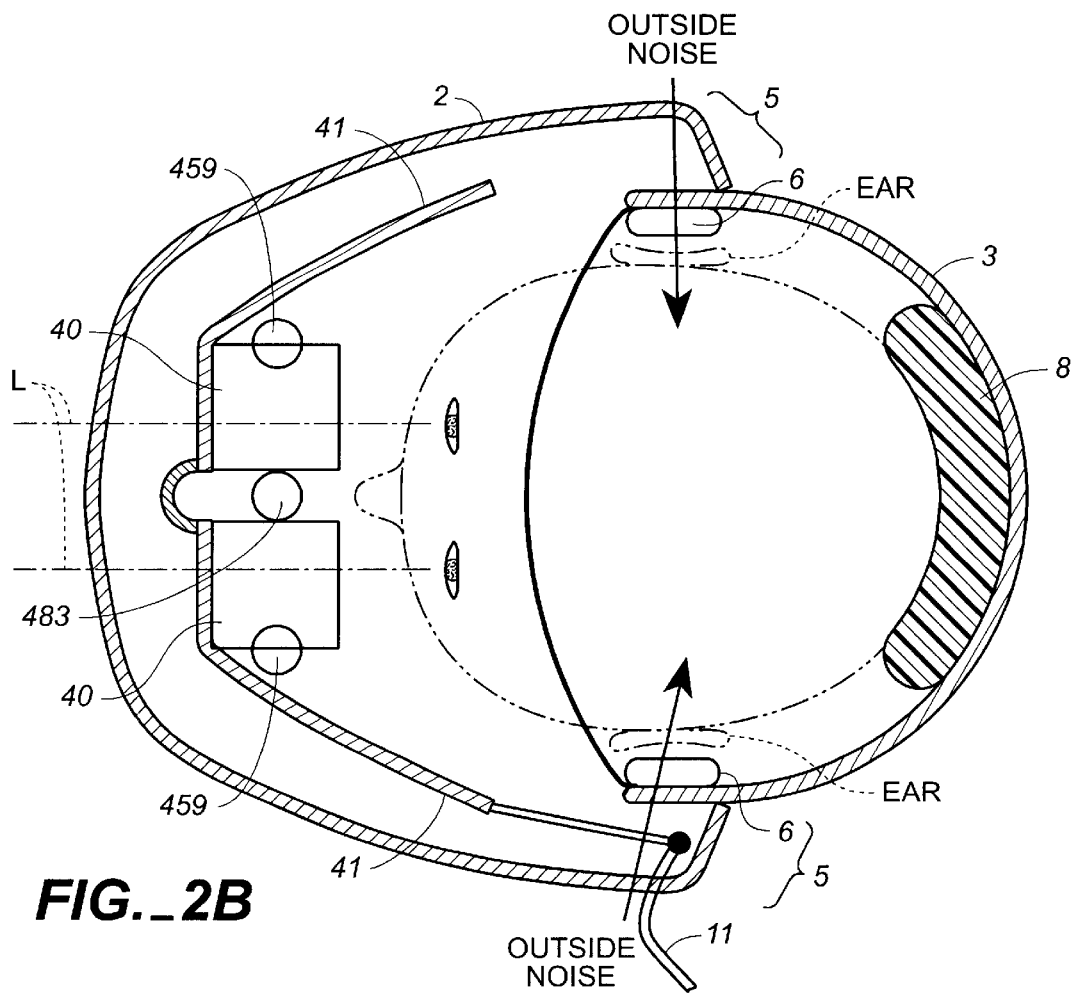
FIG._2B

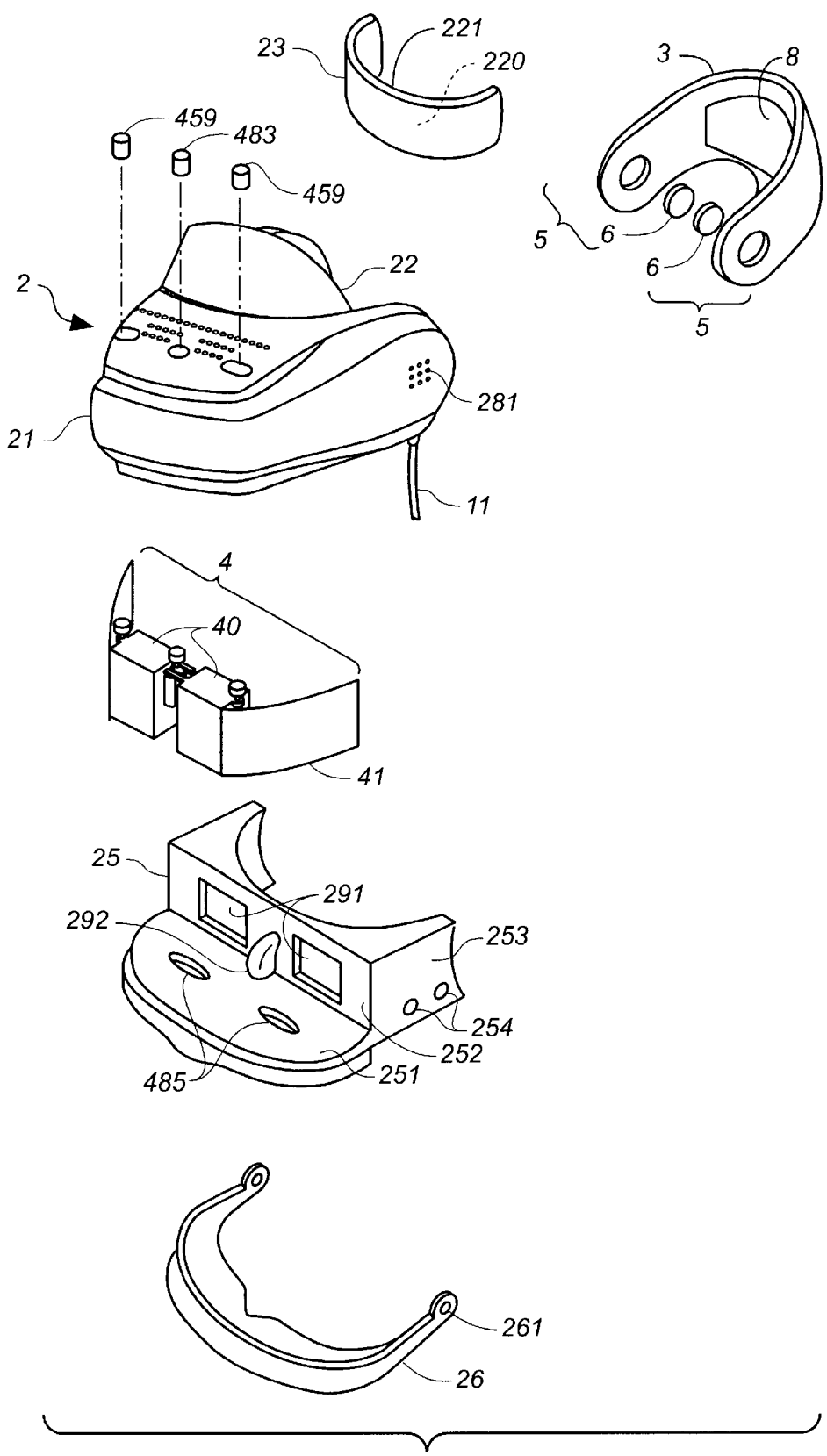
FIG._3

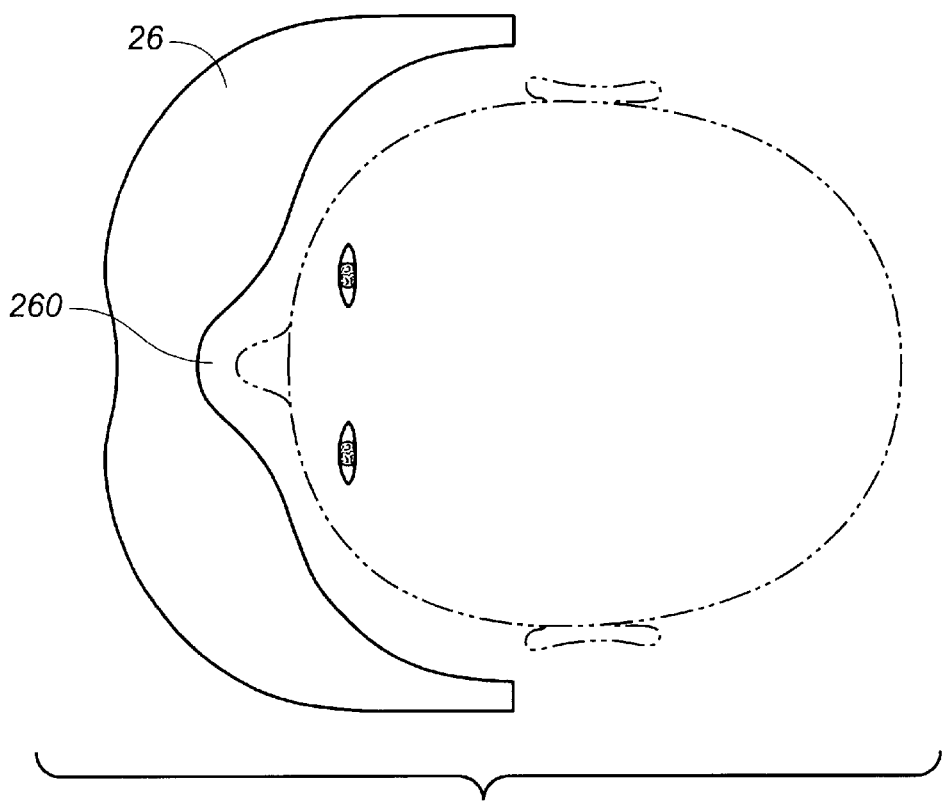
FIG._4A
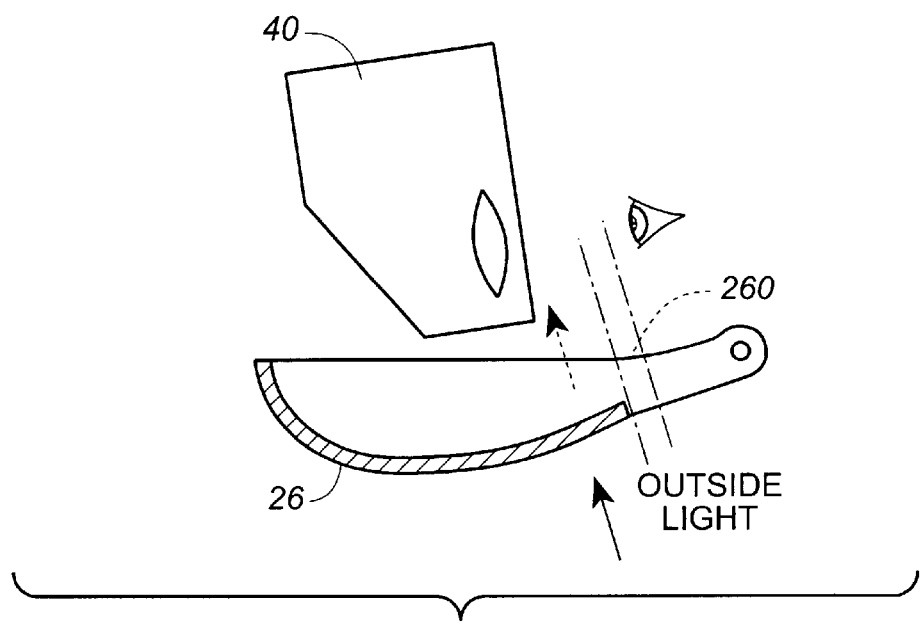
FIG._4B

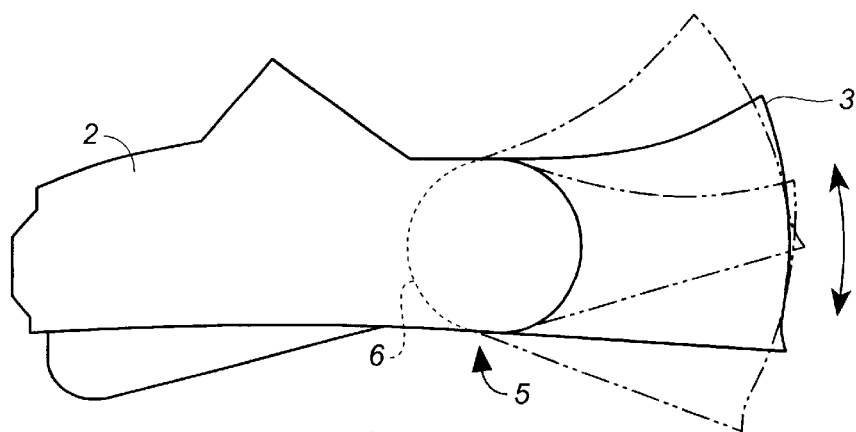
FIG._6
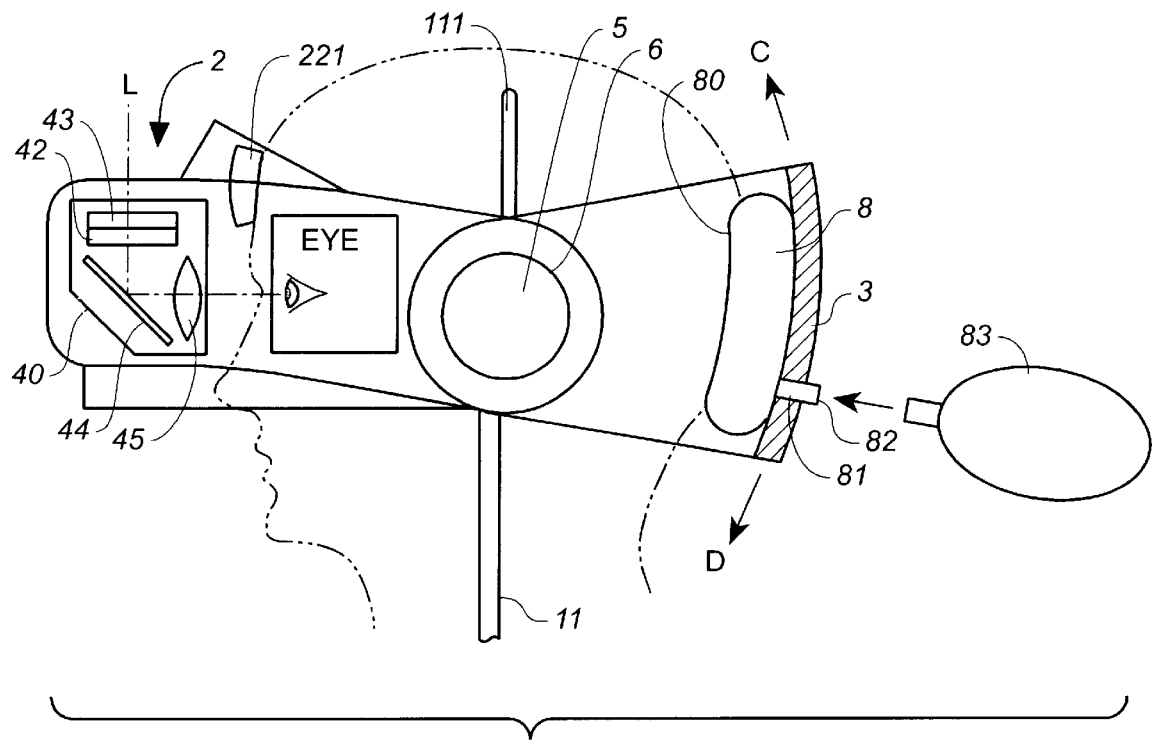
FIG._9

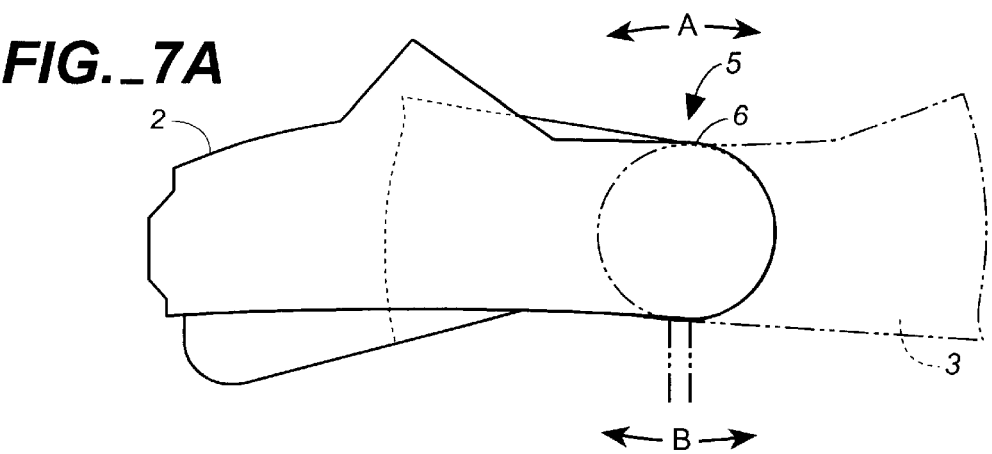
FIG._7A
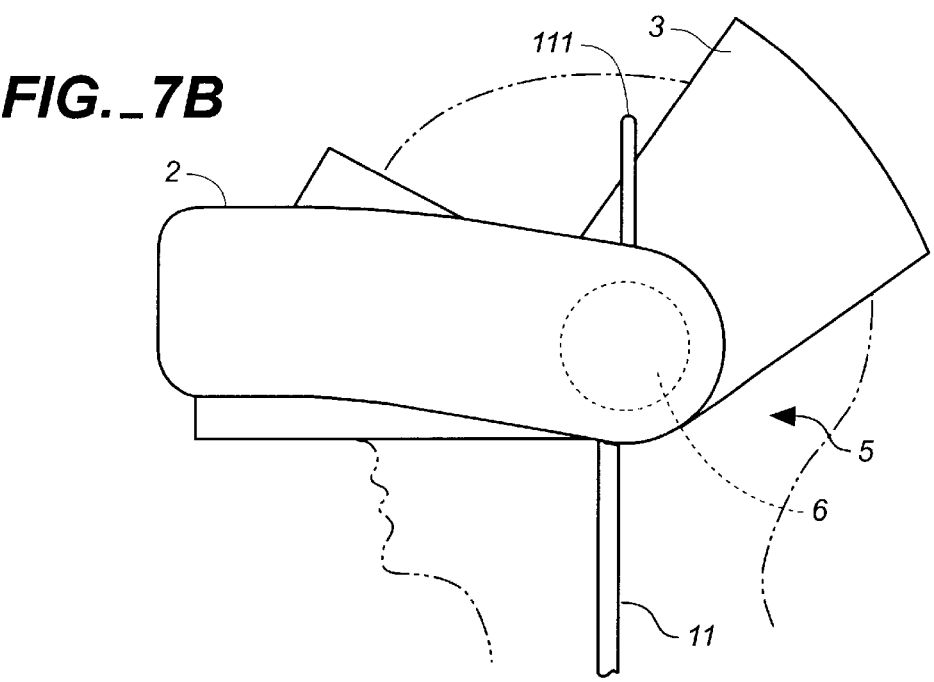
FIG._7B
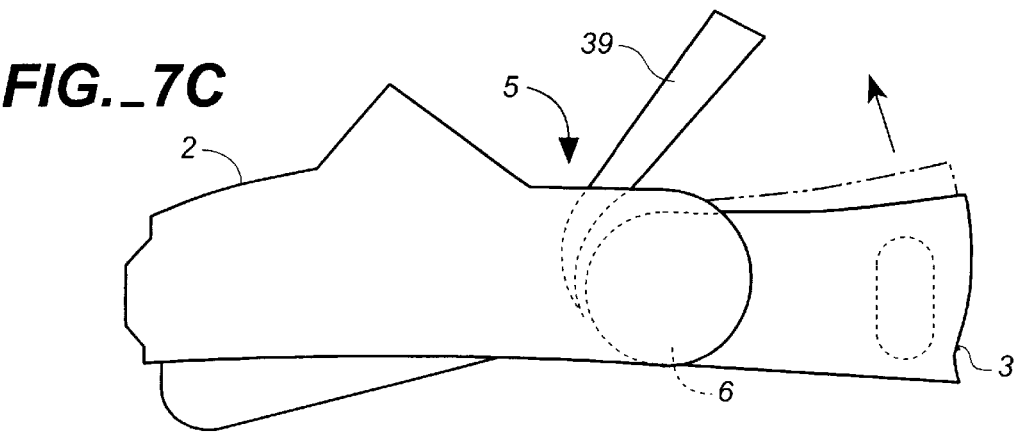
FIG._7C

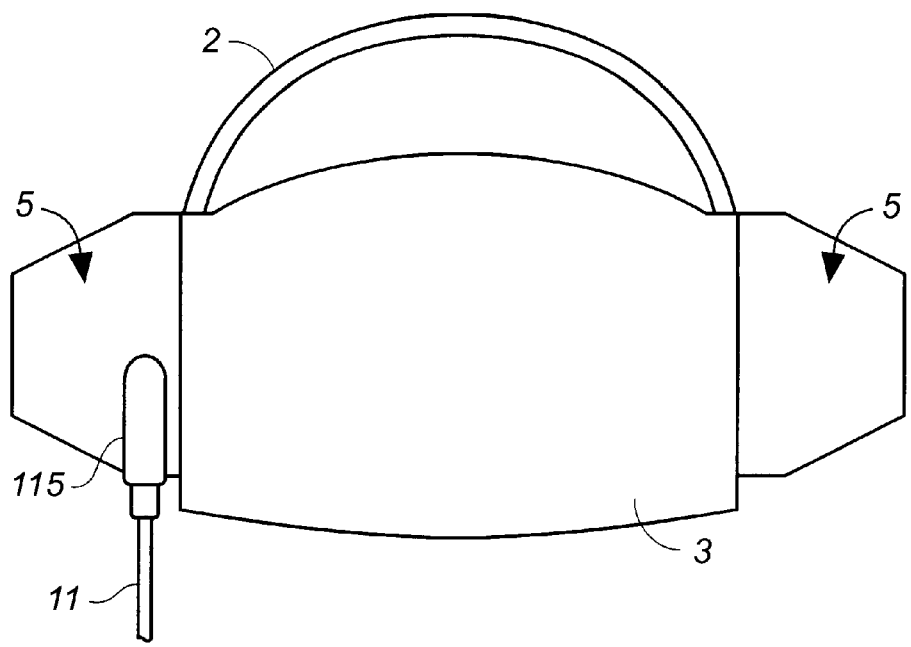
FIG._8A
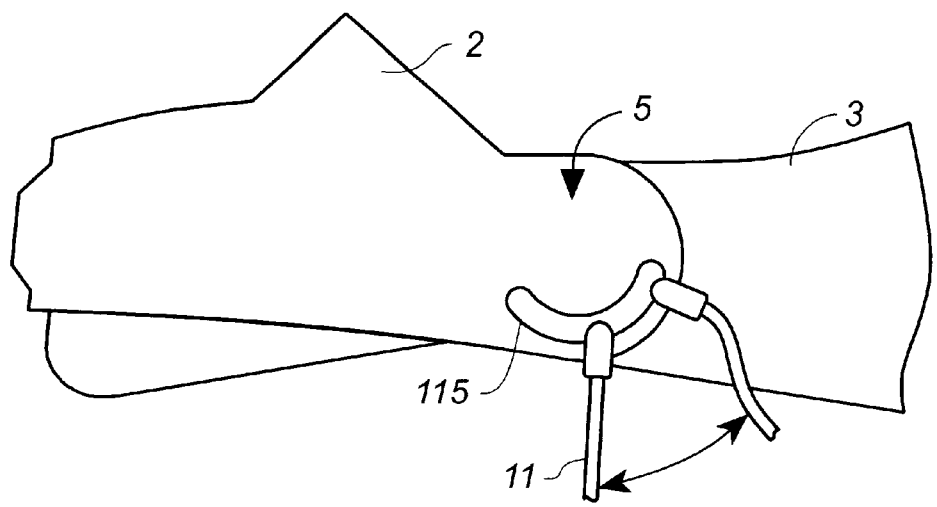
FIG._8B

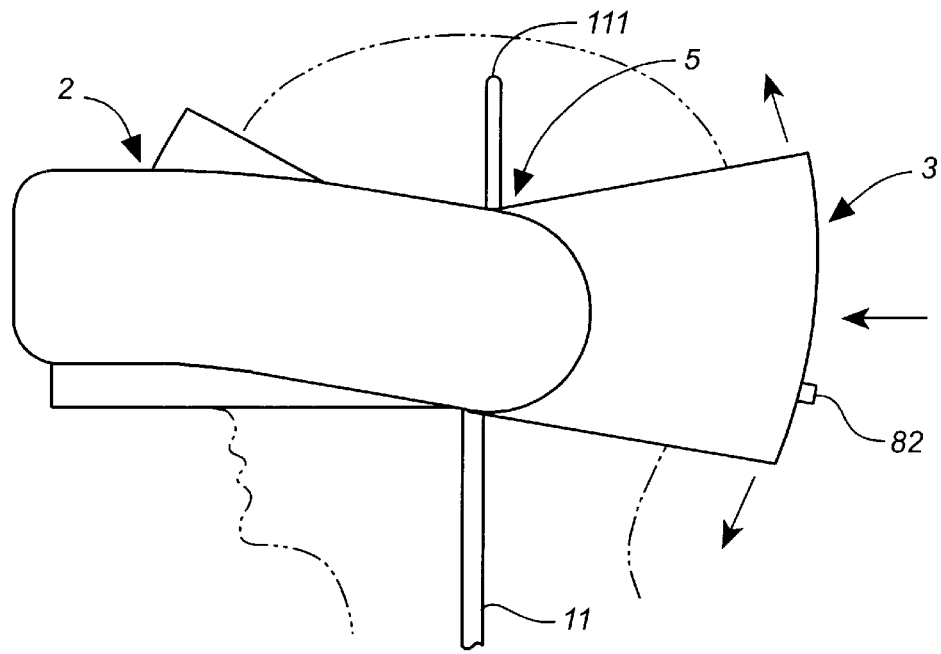
FIG._10A
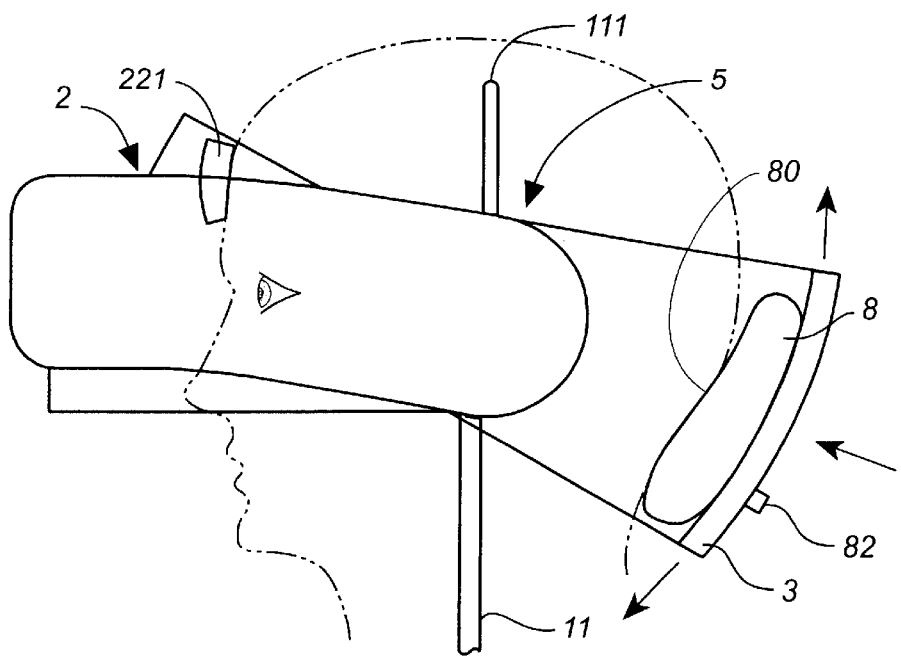
FIG._10B

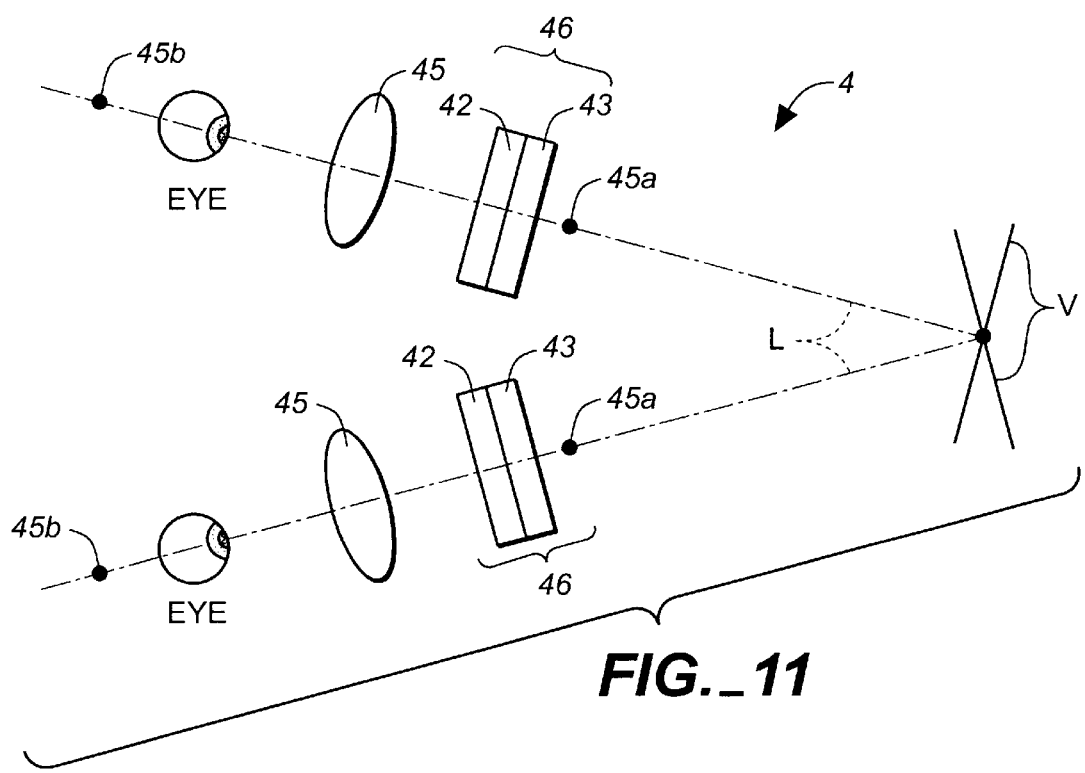
FIG._11
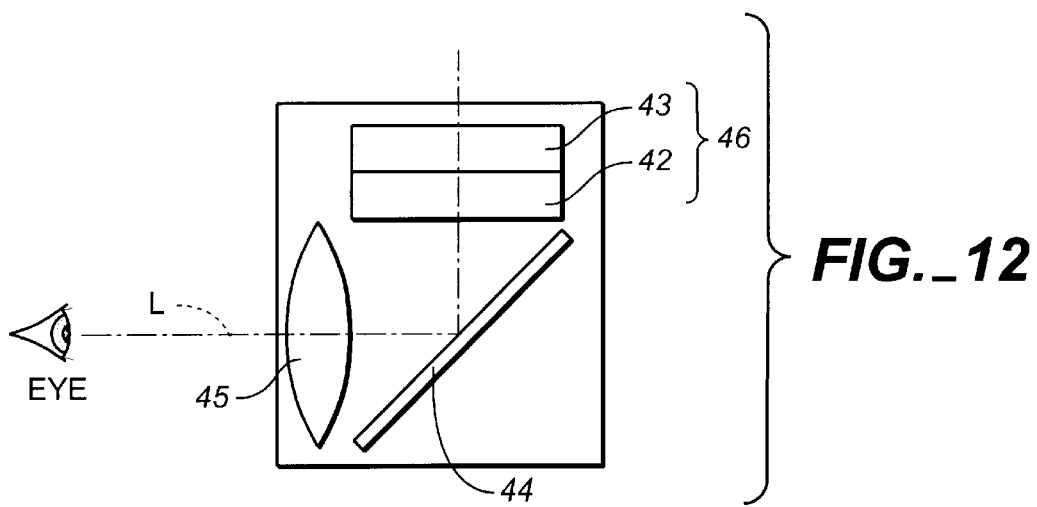
FIG._12

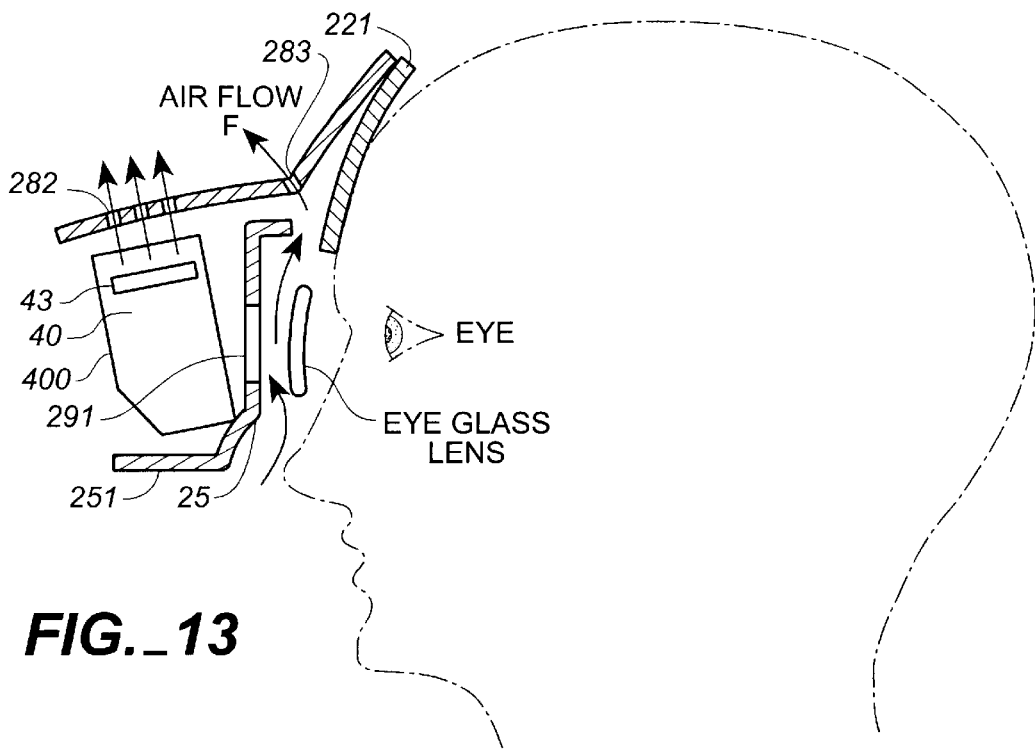
FIG._13
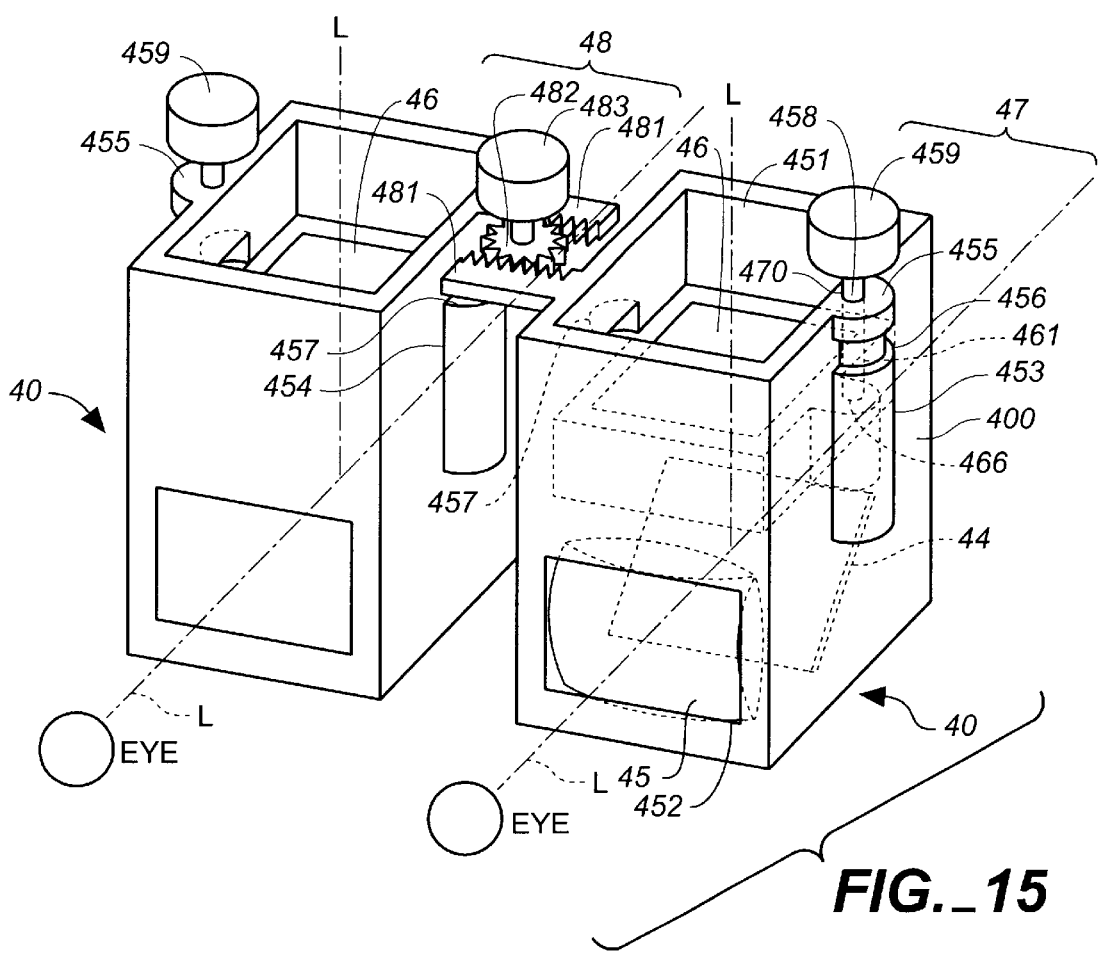
FIG._15

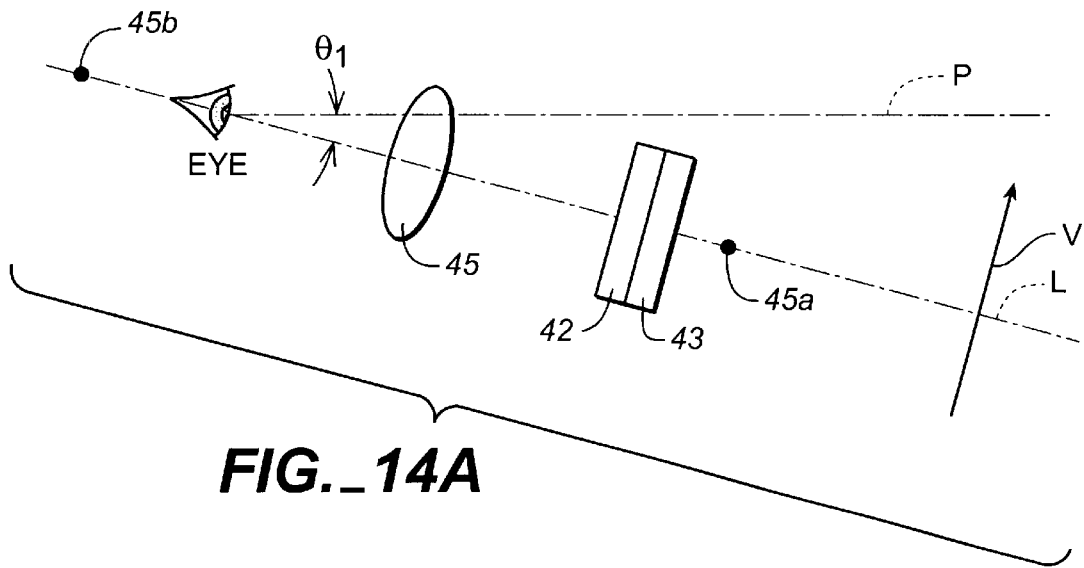
FIG._14A
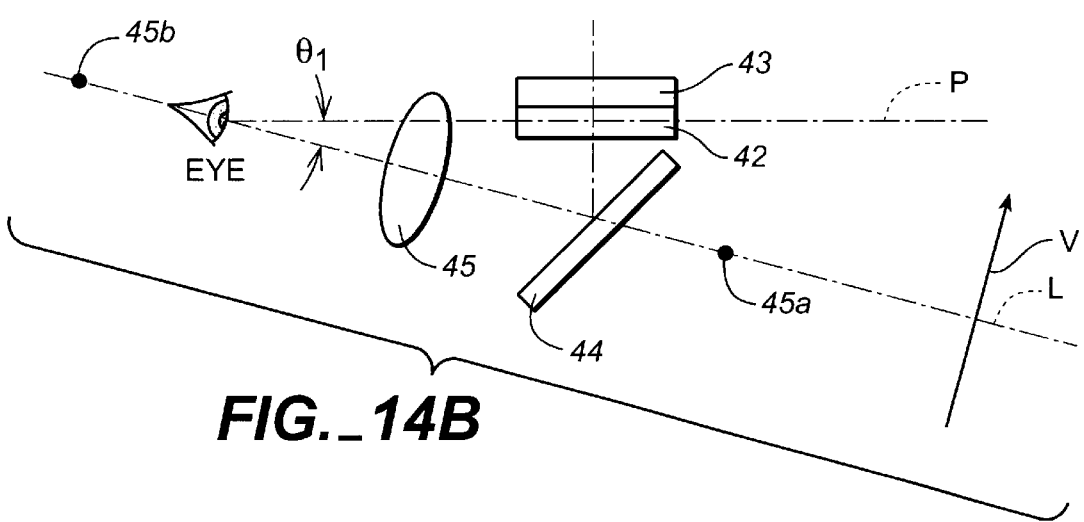
FIG._14B

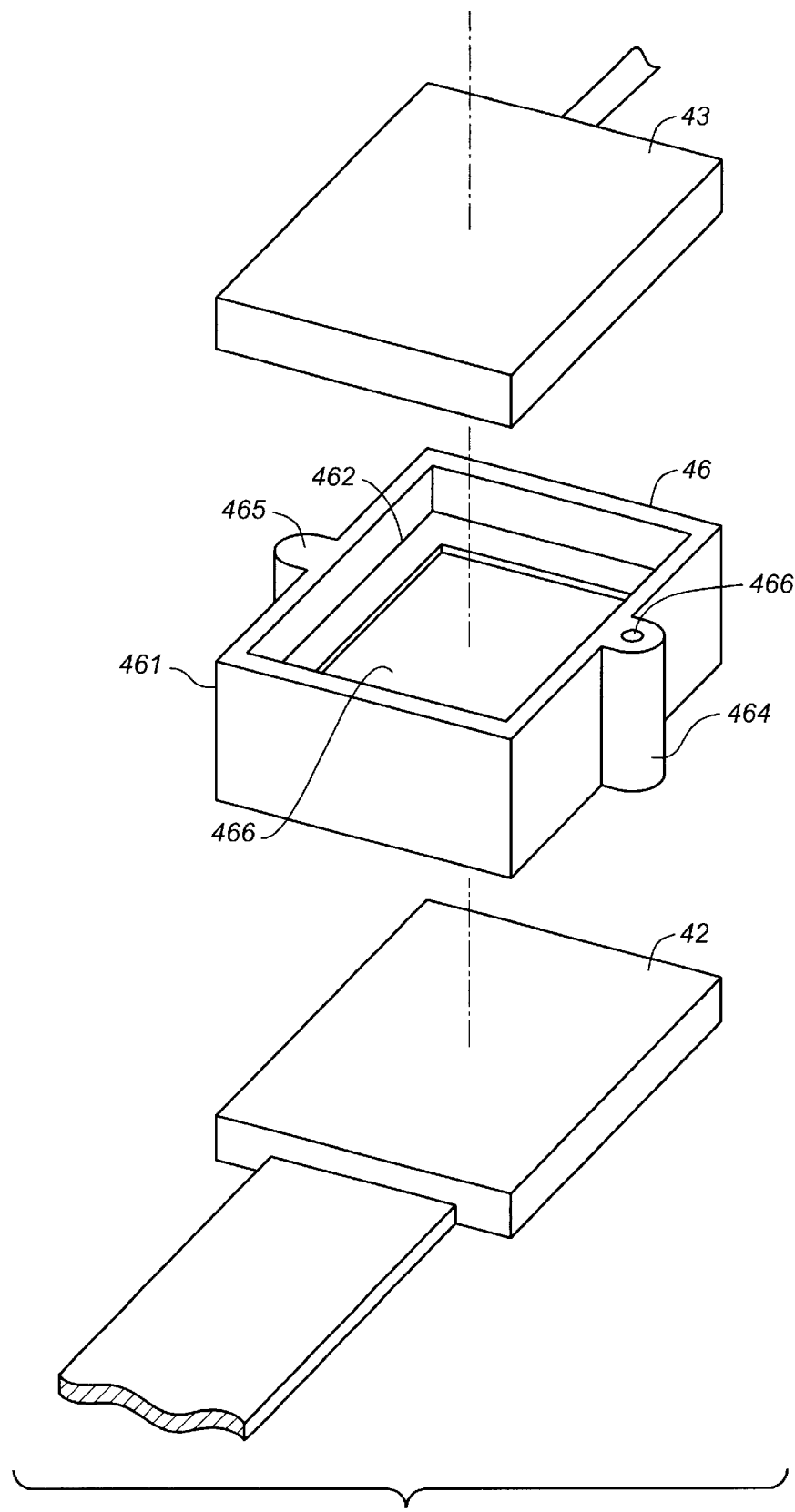
FIG._16

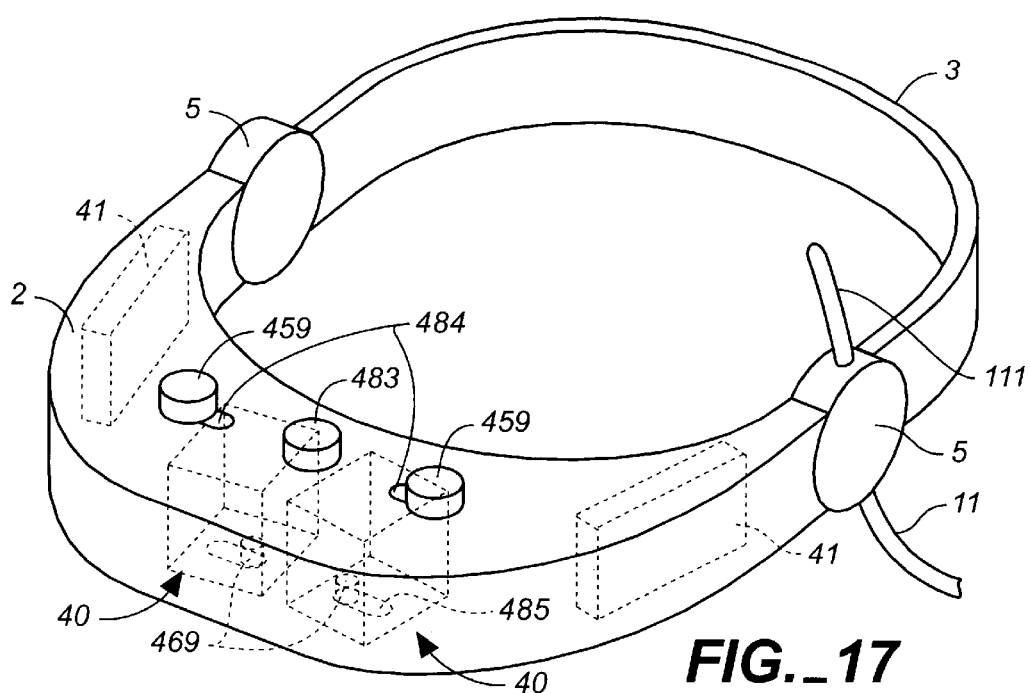
FIG._17
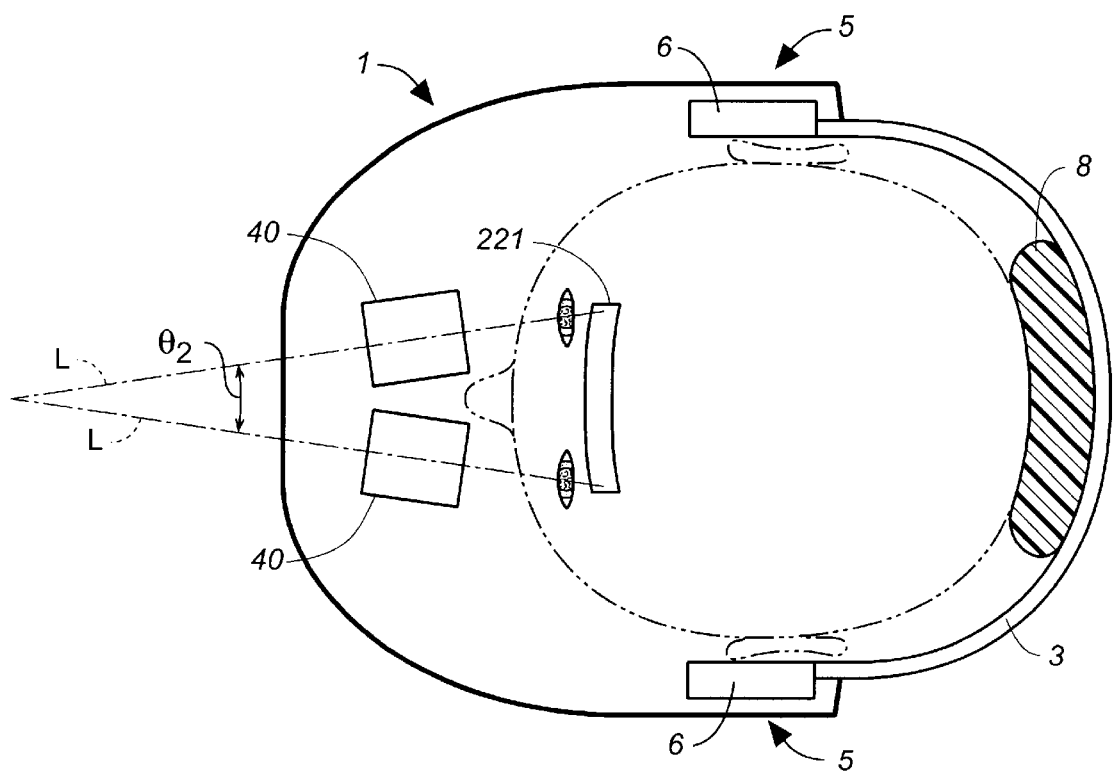
FIG._18

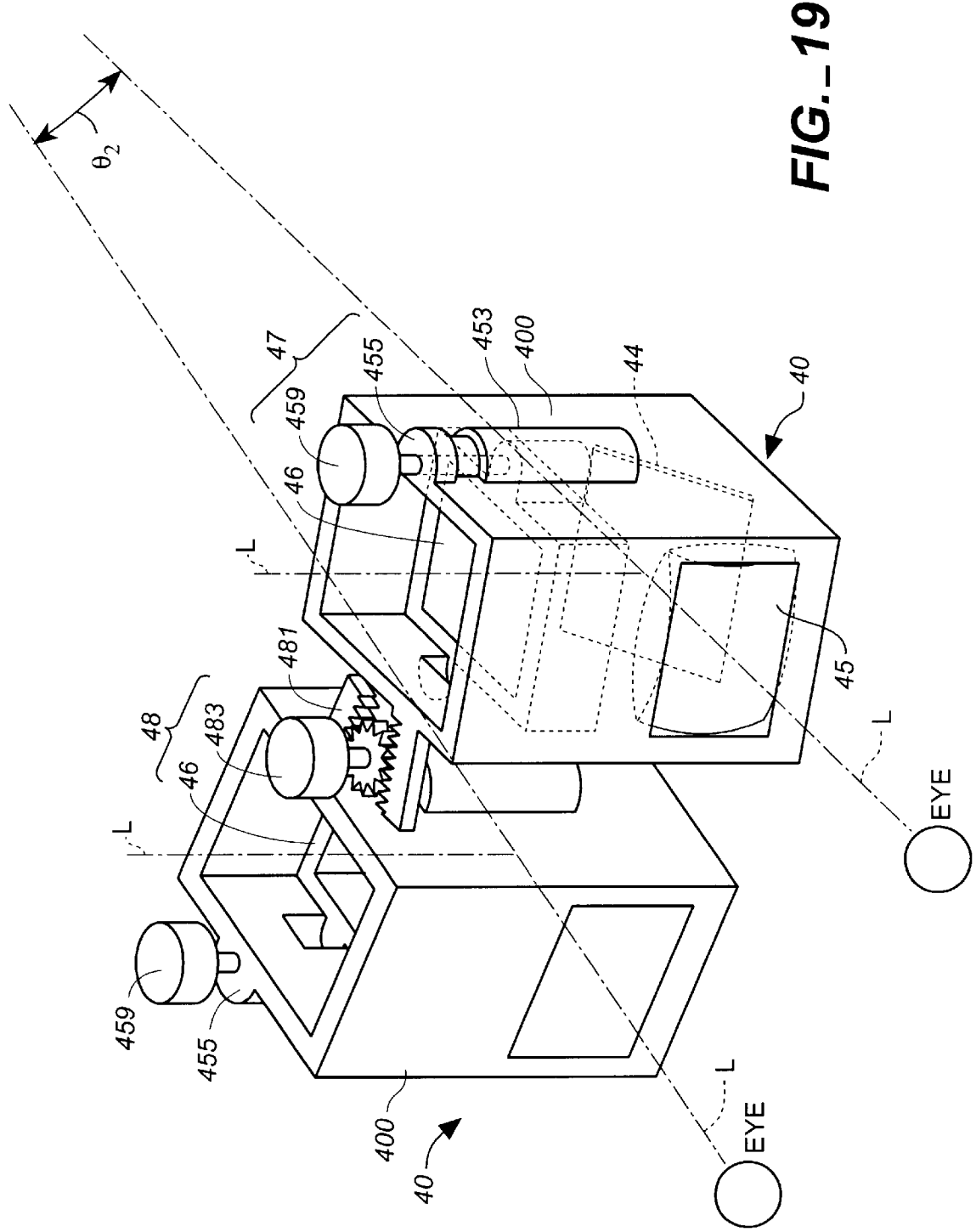
FIG._19

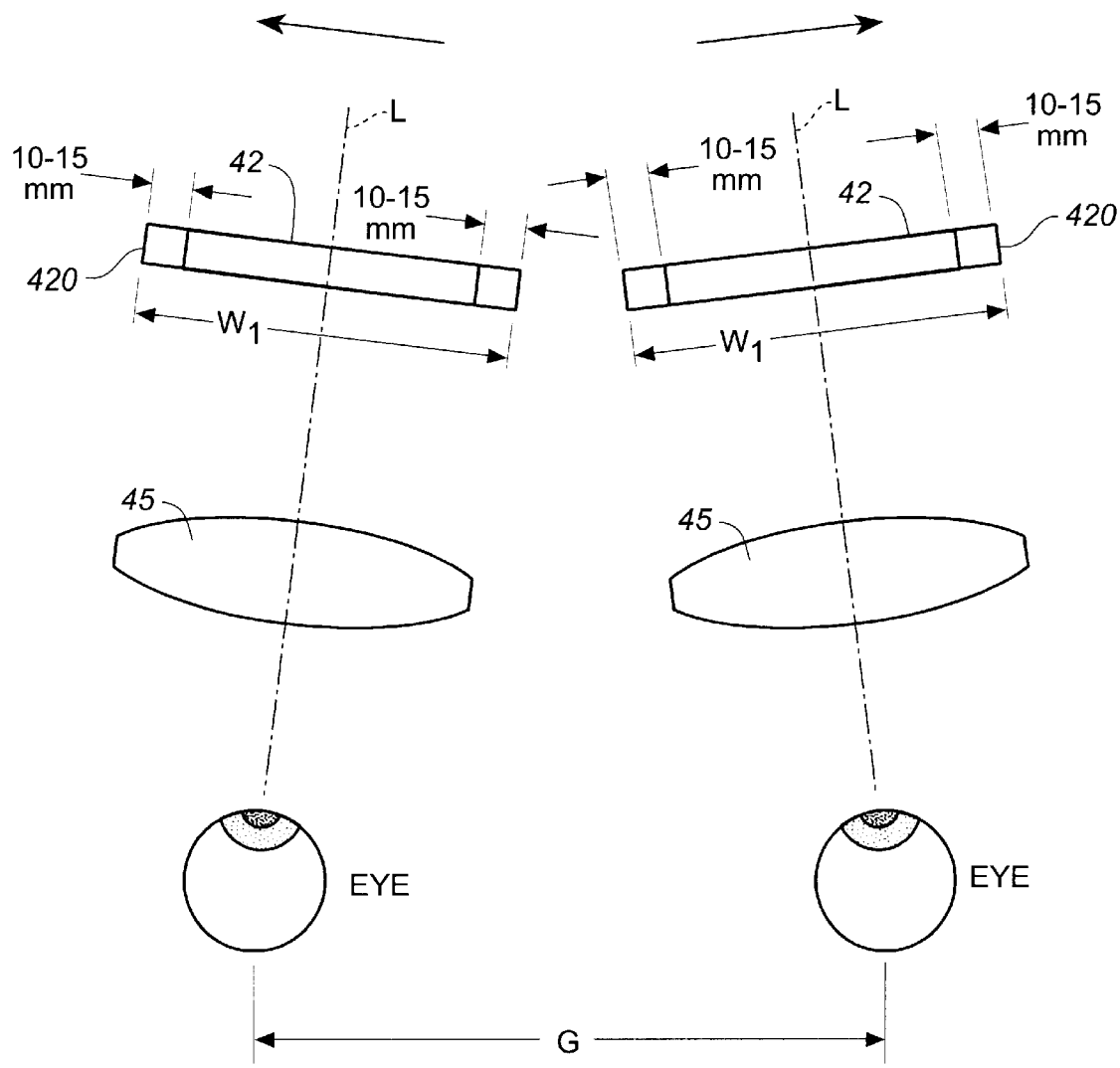
FIG._20

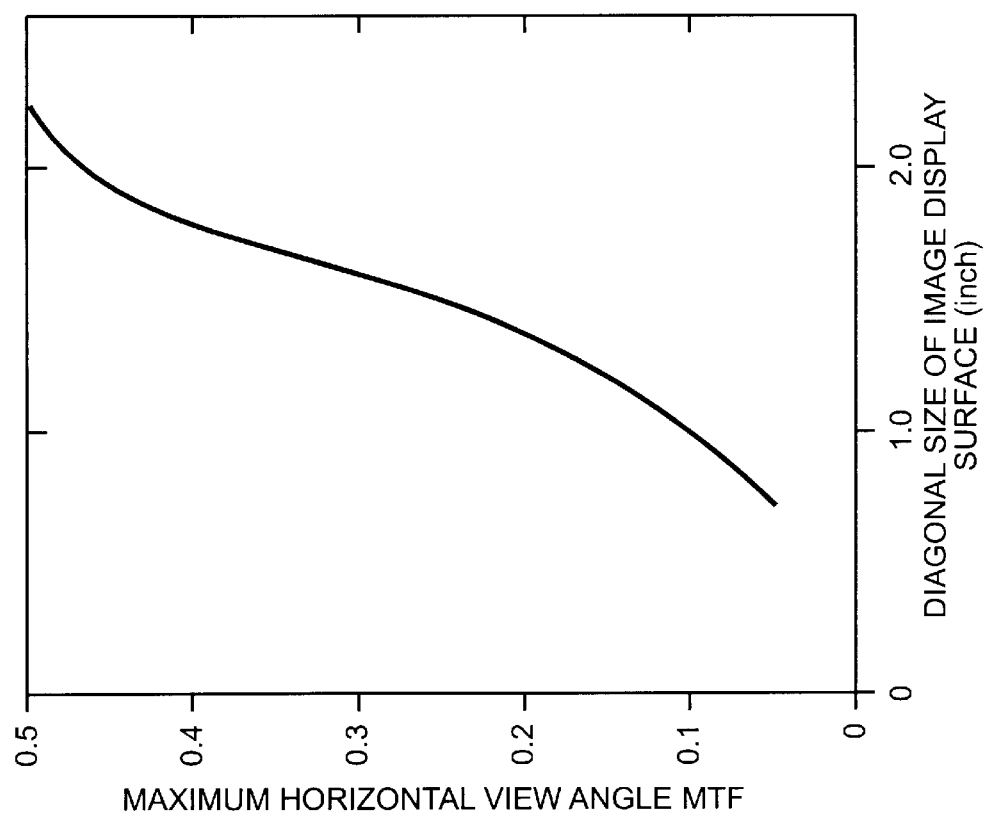
FIG._22
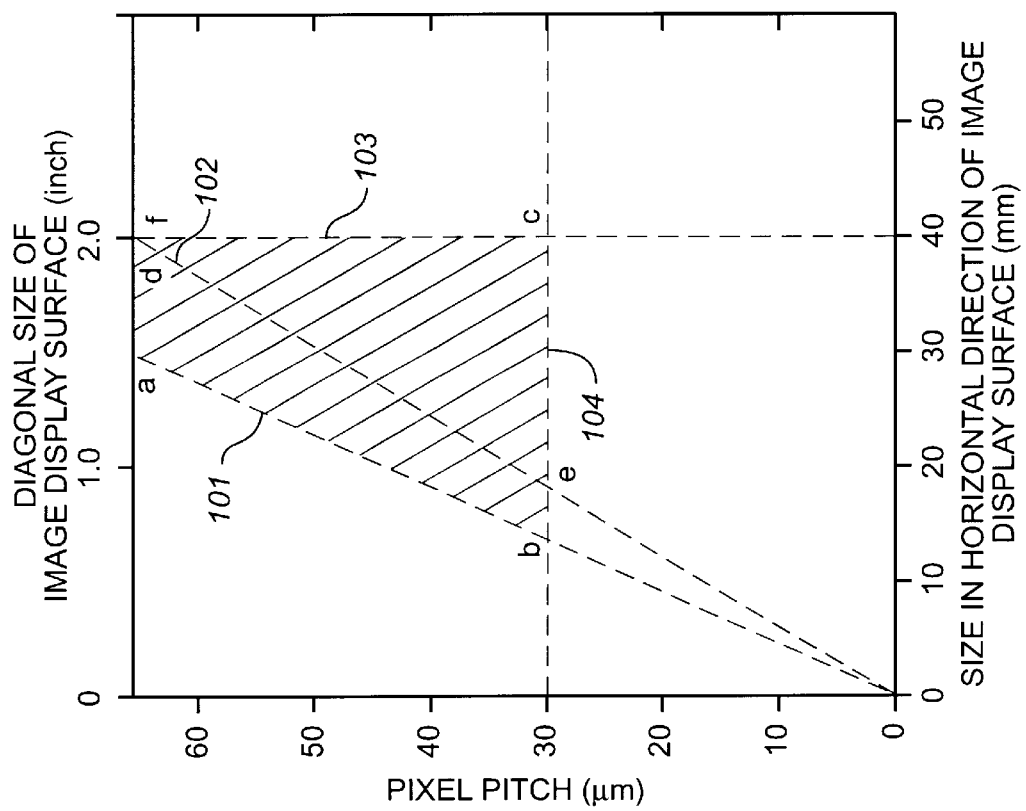
FIG._21

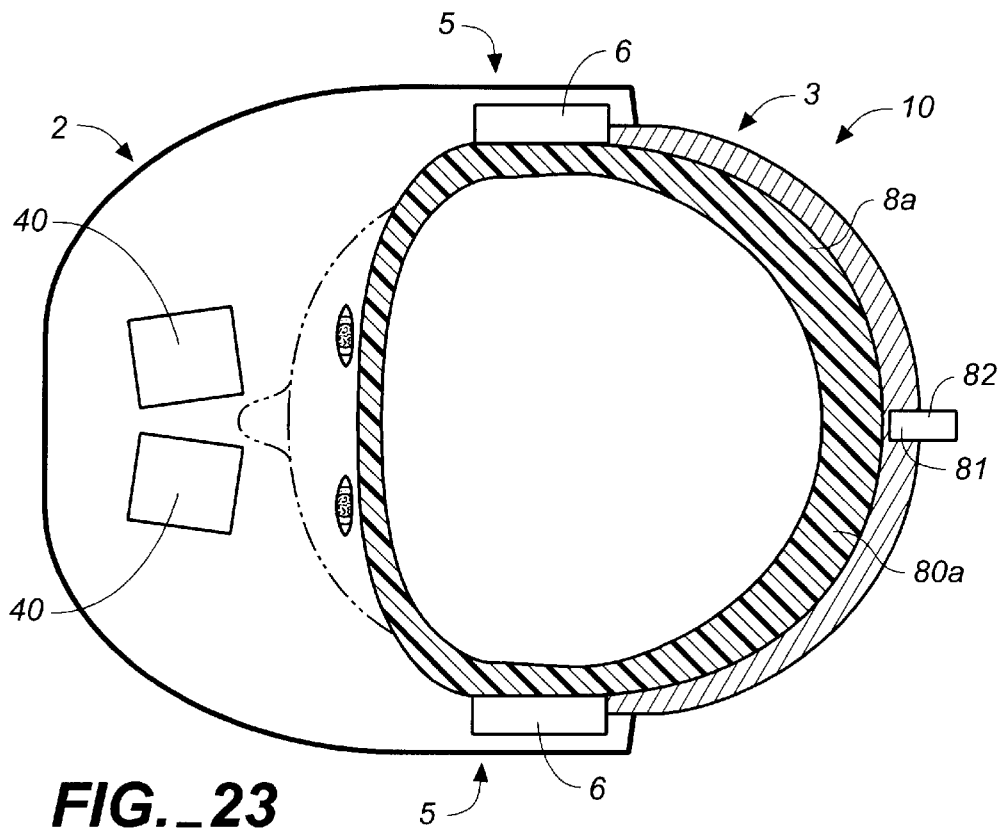
FIG._23
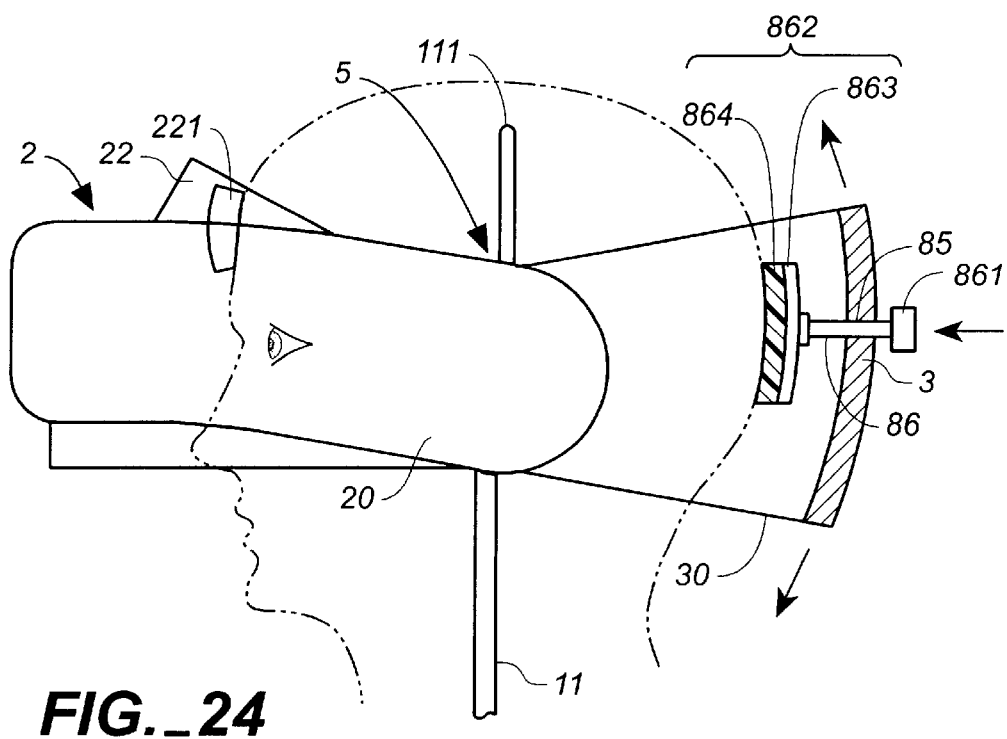
FIG._24

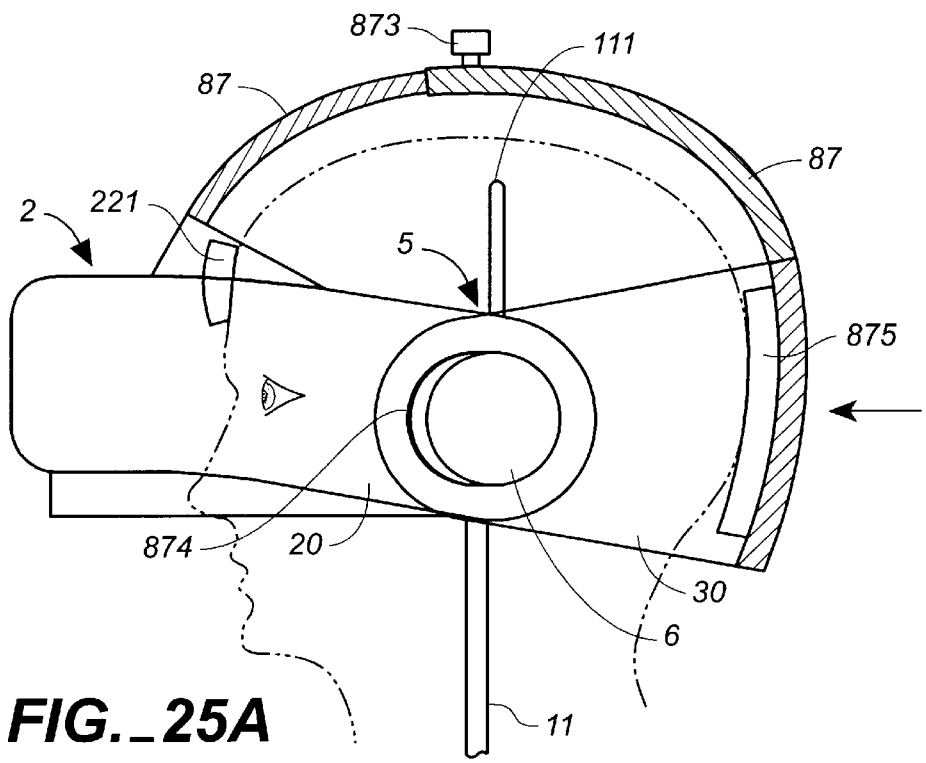
FIG._25A
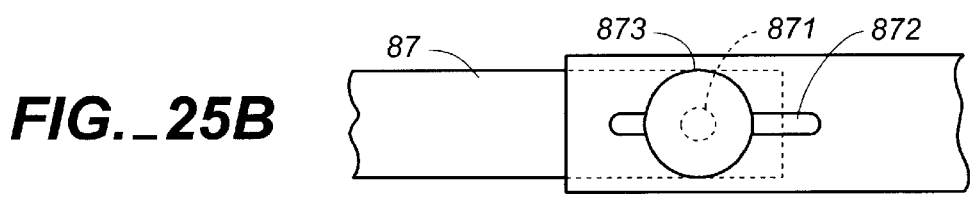
FIG._25B
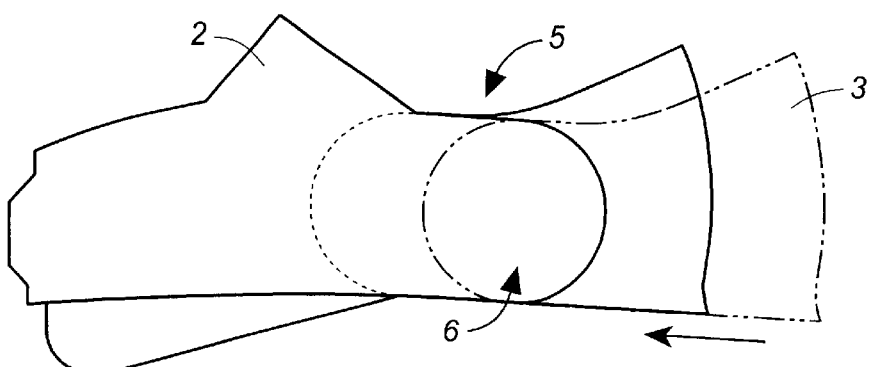
FIG._26

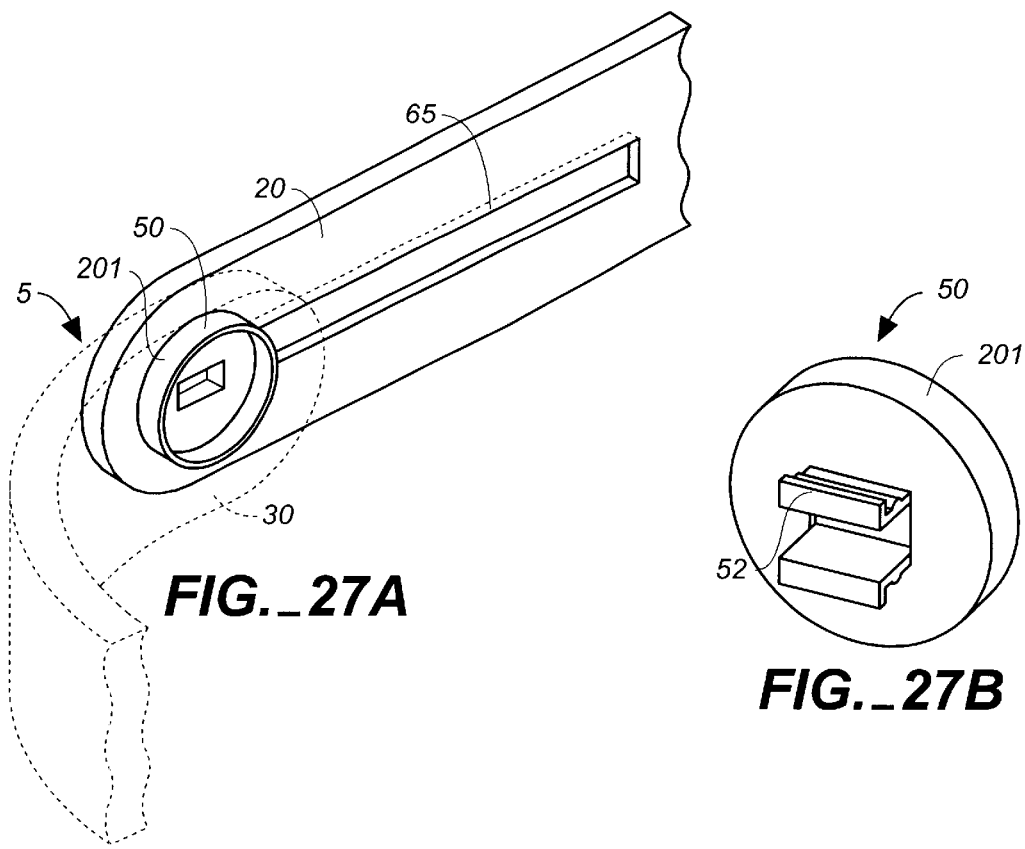
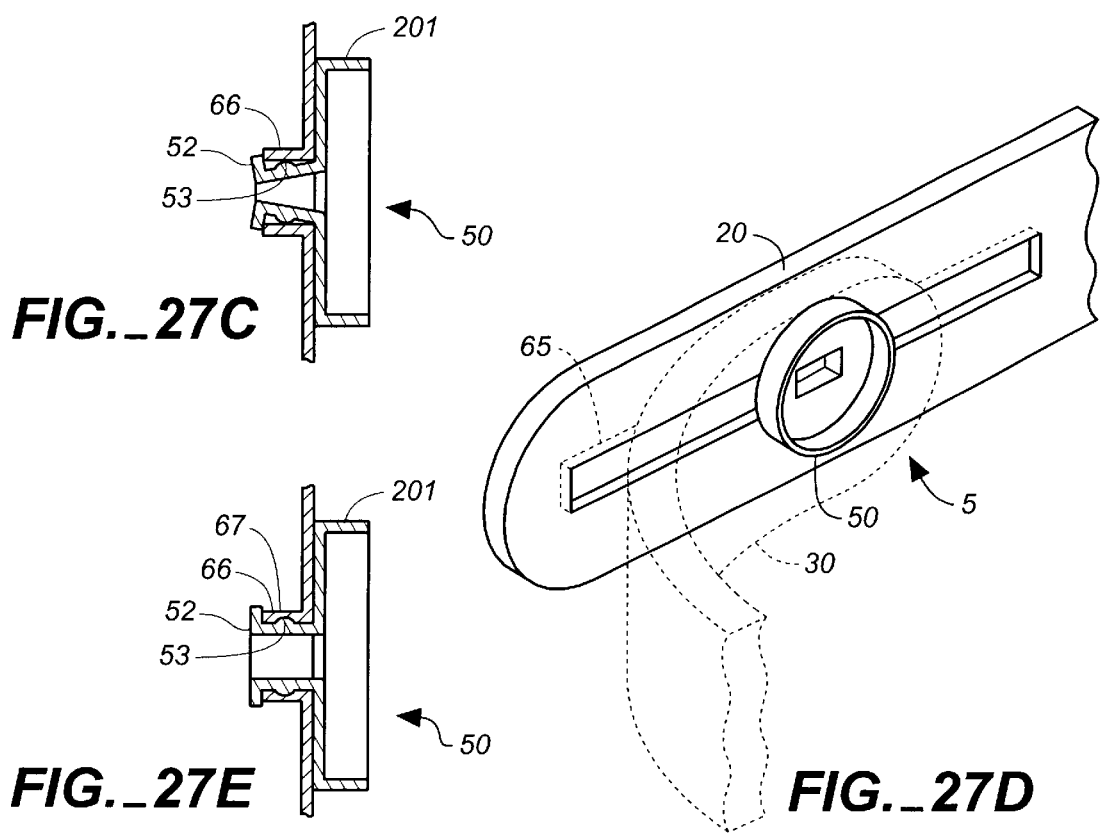
FIG._27A
FIG._27B
FIG._27C
FIG._27E
FIG._27D

HEAD-MOUNTED IMAGE DISPLAY APPARATUS

CROSS REFERENCE TO RELATED APPLICATIONS

This application is a division of application Ser. No. 08/970,544, filed Nov. 14, 1997, now abandoned, which is a continuation of Ser. No. 08/416,893, filed Jun. 22, 1995, now issued U.S. Pat. No. 5,739,893, which is a 371 of PCT/JP94/01248 filed Jul. 29, 1994, which are incorporated by reference herein in their entirety.

BACKGROUND OF THE INVENTION

1. Field of the Invention

This invention relates to an image display apparatus for virtual enlargement and viewing of images displayed by an image display means, and relates particularly to a head-mounted image display apparatus for viewing images with the display apparatus itself worn on the head.

2. Description of the Related Art

An apparatus which is worn on the head for viewing images is described, for example, in Japanese patent laid-open number 1993-100192. This apparatus comprises an eyeglasses-type frame which is worn on the head similarly to eyeglasses. As frequently experienced by eyeglasses users, fatigue and discomfort can occur in the nose and ears where the apparatus touches due to a slight increase in weight, and the functionality that can be provided in the image display apparatus and the viewing time are therefore limited. In addition, the apparatus may shift when the head or body is moved because the method of mounting on the head is unstable, and it is therefore not possible to view the images in a stable condition. Moreover, when the head or body is moved greatly, the apparatus may fall from the head and break.

With the head-mounted image display apparatus described in Japanese patent laid-open number 1992-22358, a pair of side frames extending to the sides of the head is provided on the apparatus, and the apparatus is mounted to the head by connecting the ends of these side frames with an elastic band and wrapping the side frames around the head. However, while this method prevents the apparatus from falling off the head by means of the elastic band, its effectiveness preventing the apparatus from falling off is insufficient because of the narrow width of the elastic band. Furthermore, even if the width of the elastic band is increased, there is still no change in the instability of the apparatus insofar as it is held only by an elastic band, and problems such as image blurring, fatigue, and discomfort remain.

Thus, the first problem with this conventional head-mounted image display apparatus is the poor user comfort resulting from the part to which the apparatus is mounted being the head, which varies in size and shape from person to person, and the difficulty of mounting the apparatus in a stable manner on the head.

Next, because the head-mounted image display apparatus is for personal use, it is possible to adjust the image display conditions according to the visual acuity and pupil distance (of the user) with the head-mounted image display apparatus described in Nikkei Electronics, No. 571, p. 119. However, this head-mounted image display apparatus is constructed to illuminate a pair of left and right optical units, each comprising a liquid crystal light valve, reflecting mirror, and enlarging lens, using one backlight, and the user experience is therefore poor. More specifically, if only the liquid crystal light valve, which is formed separately to the backlight, is moved along the optical axis of the optical unit to change the distance between the backlight and the liquid crystal light valve when the imaging position is adjusted according to the visual acuity of the user, illumination of the liquid crystal light valve also changes because divergent light is irradiated from the fluorescent tube used as the backlight, and image quality deteriorates. In particular, the right and left virtual images (luminance) will differ if the visual acuity of the user differs between the right and left eyes, and this will be a cause of asthenopia. Moreover, as the distance between the backlight and the liquid crystal light valve increases, the lighting efficiency of the backlight decreases, increasing the brightness of the image is inhibited, and attempts to overcome this become a hindrance to achieving low power consumption.

Furthermore, there are individual differences in the pupil distance, which is generally considered to be in the range of approximately 58 mm to approximately 72 mm. As a result, it is necessary for the right and left optical units to have a range of relative movement of approximately 14 mm. However, if this type of adjustment is performed separately for the right and left optical units in the conventional head-mounted image display apparatus, each eye must be separately adjusted, and more time is required. It is also possible that while this relative distance is acceptable, one of the optical units has moved too far, and use in this condition can lead to asthenopia.

With the head-mounted image display apparatus described in Japanese patent laid-open number 1993-48991, the optical axis formed by the image display apparatus, the enlargement optics, and the eye will be on the horizontal visual axis of the eye. As a result, because the viewer must view the images with the visual axis fixed in the horizontal direction, the eyelids feel forced open, the eyes and eyelids feel burdened, and this condition can lead to asthenopia if it continues for long.

The second problem is therefore the poor user comfort resulting from these conventional apparatuses not giving sufficient consideration to the characteristics of visual appreciation of information Another head-mounted image display apparatus is described in U.S. Pat. No. 5,162,828, and others; this apparatus provides an image display element, enlargement optics for the image displayed thereby, and a holding means for positioning the enlargement optics and display element in front of the eyes of the viewer. Of these component parts, the display element has the greatest structural influence on the other parts, and is an important component; because compactness, light weight, and low power consumption are generally required in this display element, liquid crystal display elements of minimum three inches diagonally or liquid crystal display elements of a maximum one inch diagonally are used. However, major problems may result if the liquid crystal display element is either too large or too small.

First, when the liquid crystal display element is too large, the display element itself not only becomes large, the enlargement optics for enlarging and displaying the image also increase in size. As a result, the head-mounted image display apparatus becomes extremely bulky and heavy, greatly burdening the viewer. Problems relating to addressing the liquid crystal display element also occur. Specifically, because the liquid crystal display element modules are too large in the right and left optical units, they hit each other if placed in front of the eyes, and the center of the image display plane cannot be placed on the optical axis connecting the eye and the enlargement lens. In this case, the position occupied by the enlarged image is different in the viewer's right and left visual fields, and when the brain attempts to join the right and left images when viewing television or video, the images will not completely coincide. In addition, to be recognized as a single image, it is necessary to display different images in the right and left liquid crystal display modules, making it necessary to add the circuitry and other components needed to divide and display the source image in the right and left liquid crystal display modules. The resulting problem is that it is not possible to achieve a compact, lightweight, and low cost head-mounted image display apparatus.

On the other hand, it is not possible to improve the image quality when the liquid crystal display element is too small. To improve image quality in the liquid crystal display module, it is necessary to increase the number of picture elements in the liquid crystal display element. With respect to this, however, the picture elements must be made smaller if the same number of picture elements used in the large size liquid crystal display element is to be used because the display area is small in a compact liquid crystal display element. More specifically, if the size of the liquid crystal display element is ½, the picture element size also becomes ½. Therefore, if a clear enlarged display image is to be obtained even though the picture element size is reduced by ½, the resolution of the enlargement optics must be doubled. If the head-mounted image display apparatus is to be made smaller and lighter, however, only simple enlargement optics can be provided, and it is not possible to obtain a high quality image if the liquid crystal display element is extremely small. Furthermore, the space requirement of the thin-film transistor for switching the picture elements does not change even if the size of the picture elements is reduced. As a result, as the liquid crystal display elements become smaller, the effective aperture of the picture elements decreases, and the brightness of the display image drops. In addition, because the relative size of each picture element to the source line and the gate line decreases, the shaded part of the overall display image becomes conspicuous, and the image quality of the displayed image deteriorates.

Moreover, it is necessary to increase the magnification of the enlargement optics to obtain a wide angle of view when using compact liquid crystal display elements, and this requires using a lens with a short focal length. However, it is necessary to use a single lens for the enlargement optics in a head-mounted image display apparatus because of the need to reduce size and weight, and shortening the focal length results in using a plastic lens whereby the lens thickness can be made thick. However, because of their low precision and low throughput during mass production, thick plastic lenses ultimately reduce image quality and increase cost. Furthermore, because a very slight movement of the liquid crystal display element causes a large change in the position of virtual image formation when a short focal length lens is used and the liquid crystal display element is moved forward or back along the optical axis to adjust to the visual acuity of the user, this adjustment is difficult to accomplish without providing a precision adjustment mechanism.

The third problem is therefore poor image quality, operability, and economy resulting from the conventional apparatus being simply designed using a small display apparatus without consideration for the relationship to pupil distance, and otherwise not giving sufficient consideration to improving image quality.

With consideration to the aforementioned problems, the problem for the present invention is to provide a head-mounted image display apparatus whereby the user experience can be improved by using a construction that is sufficient adaptable to, for example, head size, pupil distance, visual acuity, and sensitivity from a human anatomical perspective.

SUMMARY OF THE INVENTION

To resolve the aforementioned problem according to the present invention, a head-mounted image display apparatus for viewing an image formed by an image display means and virtually enlarged by an enlarging means while mounted on the head is characterized by: a main apparatus comprising an image display means and an enlarging means, and comprising a frontal region support member, which is positioned at the frontal region when worn on the head, and an occipital region support member, which is positioned at the occipital region; and a securing means for holding the frontal region support member and the frontal region in contact when the main apparatus is worn on the head.

By means of this configuration, the image can be viewed from the best condition because the relationship between the position of the frontal region support member and the frontal region can be directly and reliably determined. In addition, the head-mounted image display apparatus is sufficiently adaptable to the characteristic that the place to which the main apparatus is mounted is the head, and a feeling of stability during use can be obtained.

In the present invention it is possible to use as the securing means a means comprising an inflating/deflating member that can be switched between an inflated condition and a deflated condition at that part of the inside surface of the occipital region support member contacting the occipital region.

It is also possible to use as the securing means a means comprising a displacement mechanism for moving the position of the occipital region support member on the main apparatus toward the frontal region support member, thereby relatively pushing the frontal region against the frontal region support member.

In these cases a flexible member, and preferably a buffer pad which is freely removable by means of a velcro-like material, is provided on the frontal region support member where it contacts the frontal region.

According to the present invention, a head-mounted image display apparatus for viewing an image formed by an image display means and virtually enlarged by an enlarging means while mounted on the head is characterized by: a main apparatus comprising an image display means and an enlarging means, and comprising a frontal region support member, which is positioned at the frontal region when worn on the head, and an occipital region support member, which is positioned at the occipital region; and an inflating/deflating member, which can be switched between an inflated condition and a deflated condition, on the inside of the main apparatus at least at the inside surface of the frontal region support member and the occipital region support member. In this case, inflation of the inflating/deflating member is preferably greater at the occipital region support member side than at the frontal region support member side. This is because the stability of the main apparatus in the front-back direction is improved by pressing from the back.

The inflating/deflating member of the present invention is preferably made from an air bag. This is because the apparatus is thus simplified and can be made lighter.

It is further preferable in the present invention to provide the main apparatus with: a front cover comprising an image display means, enlarging means, and frontal region support member; an occipital region support cover comprising the occipital region support member; and connecting members connecting these covers at the sides of the head; and to provide in this connecting member a support mechanism connecting the occipital region support cover to the front cover in such a manner that the occipital region support cover rotates on the support mechanism to the front cover. In this case it is preferable to provide the connecting member with a slide mechanism whereby the occipital region support cover can slide toward the front cover while the occipital region support cover remains rotatable to the front cover.

Furthermore, when speakers are built in to the connecting member, it is preferable to use the speakers as component elements of the support mechanism. Specifically, it is preferable to use the speaker frame itself as the rotational axis connecting the occipital region support cover in a rotatable manner to the front cover. In addition, an air hole passing through from the inside to the outside is preferably provided in the connecting member so that external sounds can be heard even when speakers are built in to the connecting member.

It is furthermore preferable to provide a ventilation hole in the front cover.

The present invention further preferably comprises the image display means as an integrated image display unit comprising a transparent image display member and a lighting means for illuminating this image display member from the back; comprises a pair of optical units, each integrating this image display unit with an enlarging means, housed on right and left sides in the main apparatus; and comprises a pupil distance direction position adjustment mechanism for moving the pair of optical units as a single unit in the pupil distance direction to adjust the distance between the optical axes of the optical units.

In this case, the pupil distance direction position adjustment mechanism preferably moves the optical units in the pupil distance direction by guiding a guide pin projecting from each optical unit in a guide channel formed to fit the guide pin on the side of the main apparatus. The operating knob of the pupil distance direction position adjustment mechanism is also preferably positioned at a front position of the main apparatus.

It is further preferable to provide as a diopter adjustment mechanism for each of the pair of optical units an axial position adjustment mechanism to move the image display units along the optical axis of the optical unit separately in each optical unit. It is also preferable in this case to position the operating knob of the axial position adjustment mechanism at a front position of the main apparatus.

In the present invention it is preferable to provide in the main apparatus at a position corresponding to the top of the optical unit a ventilation hole for releasing heat produced by the lighting means.

The optical axes of the optical units are also preferably set so that lines extended on the optical axes to the front intersect at the angle of convergence. This is because this angle is a more natural line of vision, and there is therefore a lesser sense of fatigue.

In addition, a reflecting mirror is preferably provided at a midpoint position of the optical axis to bend the optical axis of the optical unit. This is because the side of the image display unit and the enlarging means can be placed more three-dimensionally.

A liquid crystal light valve, for example, is preferably used as the transparent display member of the present invention.

In addition, the optical axis of the optical system including the image display means and the enlarging means preferably forms an angle of depression relative to the eye's horizontal line of vision. This is because images can be viewed at a more natural line of vision, and there is therefore a lesser sense of fatigue. This angle of depression is 10° or less and preferably 6° or less.

The image display means of the present invention can be made as a pair of right and left liquid crystal display modules of liquid crystal display elements mounted on a circuit board; the liquid crystal display module is preferably designed to satisfy the equation $$W_1 < G$$

where $W_1$ is the horizontal width of the liquid crystal display module in millimeters, and G is the center-center distance between the right and left liquid crystal display elements in millimeters.

It is sufficient here to set the center-center distance between the right and left liquid crystal display elements to approximately 55 mm.

When the enlarging means comprises a single magnifying lens in the present invention, the liquid crystal display module is designed to satisfy the following equation $$30 \times 10^{-3} = P = 0.0021 \times W_2$$

where $W_2$ is the horizontal width of the image display surface of the liquid crystal display element in millimeters, and P is the pixel pitch in millimeters.

In this case, the horizontal angle of view of the enlarged virtual image is preferably 30° or greater to improve the image quality.

The liquid crystal display module even more preferably satisfies the equation $$P = 0.0016 \times W_2.$$

For the purpose of improving user comfort, the main apparatus of the present invention is preferably open in the area at the top of the head. In addition, a housing portion of an optical system containing the image display means and the enlarging means, and a frontal region support cover extending from this optical system housing space at an angle following the shape of the frontal region are preferably provided in the main apparatus, and the inside surface of this frontal region support cover is preferably the frontal region support member. This is to prevent the main apparatus from sliding off.

Furthermore, when a housing portion of an optical system is provided, and a dividing wall dividing this housing portion of the optical system is provided on the face side in the main apparatus, recessed members recessed toward the optical system housing space are preferably formed in the dividing wall in the area where the nose is positioned.

Furthermore, a semi-transparent shade cover is preferably provided pointing down at the front side of the main apparatus. In this case, the shade cover is preferably of a size assuring a downward field of view. This is to enable the user to see the floor area, and thereby improve safety.

For the purpose of reducing the weight of the main apparatus and improving the degree of freedom in design, the drive circuit for the image display means is preferably provided on a flexible circuit board, and this flexible circuit board is preferably placed along the inside of the main apparatus.

BRIEF DESCRIPTION OF THE DRAWINGS

FIG. 1 is a perspective drawing showing the appearance of a head-mounted image display apparatus according to the preferred embodiment of the present invention.

FIG. 2(a) is a vertical cross section, and FIG. 2(b) is a horizontal cross section, simulating the method of using the head-mounted image display apparatus shown in FIG. 1.

FIG. 3 is an exploded view of the head-mounted image display apparatus shown in FIG. 1.

FIG. 4(a) is a descriptive drawing showing the relationship between the position of the viewer's eyes and the shade cover when the head-mounted image display apparatus shown in FIG. 1 is worn on the head, and FIG. 4(b) is a descriptive drawing showing the relationship between the position of the face and the shade cover in this condition.

FIG. 5 is an exploded view showing the connecting structure of the front cover and the occipital region support cover in the head-mounted image display apparatus shown in FIG. 1.

FIG. 6 is a descriptive drawing showing what occurs when the occipital region support cover is rotated on the connecting member shown in FIG. 5.

FIG. 7(a) is a descriptive drawing showing the condition when the occipital region support cover is stored in the front cover using the pivoting action of the occipital region support cover shown in FIG. 6; FIG. 7(b) is a descriptive drawing showing when the occipital region support cover is rotated to a position above the head from the occipital region; and FIG. 7(c) is a descriptive drawing showing when a support belt is added to the connecting member shown in FIG. 6.

FIG. 8(a) is a back view showing a method for connecting a cable that is different from the method shown in FIG. 1; and FIG. 8(b) is a side view thereof.

FIG. 9 is a descriptive drawing showing the method of securing the main apparatus to the head in the head-mounted image display apparatus shown in FIG. 1.

FIG. 10(a) is a descriptive drawing showing an example of the main apparatus secured to the head shown in FIG. 9; and FIG. 10(b) is a descriptive drawing showing the main apparatus secured to a different head.

FIG. 11 is a descriptive drawing showing the basic principle of the optical system in the head-mounted image display apparatus shown in FIG. 1.

FIG. 12 is a descriptive drawing showing a reflecting mirror inserted to the optical axis of the optical system shown in FIG. 11.

FIG. 13 is a descriptive drawing showing the location of the optical unit comprising the optical system shown in FIG. 12 in the main apparatus.

FIG. 14(a) is a descriptive drawing showing the relationship between the horizontal line of vision and the optical axis in the head-mounted image display apparatus shown in FIG. 1; and FIG. 14(b) is a different descriptive drawing showing the relationship between a horizontal line of vision and the optical axis.

FIG. 15 is a perspective view showing the construction of the optical units provided in the head-mounted image display apparatus shown in FIG. 1.

FIG. 16 is an exploded view simulating the construction of the image display unit provided in the optical unit shown in FIG. 15.

FIG. 17 is a descriptive drawing simulating the placement of the optical units shown in FIG. 15 in the main apparatus.

FIG. 18 is a descriptive drawing showing the condition when the angle of convergence is formed using the optical units shown in FIG. 15.

FIG. 19 is a perspective view showing the construction of the optical units used to form the angle of convergence shown in FIG. 18.

FIG. 20 is a descriptive drawing showing the constraints related to the width of the optical units shown in FIG. 15.

FIG. 21 is a graph showing the optimization conditions for the size and pixel pitch of the image display surface in the optical system provided in the head-mounted image display apparatus shown in FIG. 1.

FIG. 22 is a graph showing the relationship between the size of the image display surface and the MTF of the maximum horizontal view angle in the optical system provided in the head-mounted image display apparatus shown in FIG. 1.

FIG. 23 is a descriptive drawing simulating the structure for securing to the head the main apparatus used in a head-mounted image display apparatus according to a second embodiment of the present invention.

FIG. 24 is a descriptive drawing simulating the structure for securing to the head the main apparatus used in a head-mounted image display apparatus according to a third embodiment of the present invention.

FIGS. 25(a) and (b) are descriptive drawings simulating the structure for securing to the head the main apparatus used in a head-mounted image display apparatus according to a fourth embodiment of the present invention.

FIG. 26 is a descriptive drawing simulating the structure for securing to the head the main apparatus used in a head-mounted image display apparatus according to a fifth embodiment of the present invention.

FIGS. 27(a)–(e) are exploded views showing the securing structure shown in FIG. 26.

DESCRIPTION OF THE PREFERRED EMBODIMENTS

FIG. 1 is a perspective drawing showing the appearance of a head-mounted image display apparatus according to the present invention; FIGS. 2(a) and (b) are cross sections of the apparatus on the head; and FIG. 3 is an exploded view of the apparatus.

(Overall Structure)

In FIG. 1, head-mounted image display apparatus 1 of the present embodiment is an image display apparatus for viewing images with main apparatus 10 worn on the head. Main apparatus 10 comprises front cover 2 and occipital region support cover 3 (the occipital region support member); the top of main apparatus 10 is open. As result, even when main apparatus 10 is worn on the head, main apparatus 10 does not contact the top of the head, and the hair is not as easily disturbed. In addition, the weight balance both in the front-back direction and the side-side direction is assured when main apparatus 10 is worn on the head because main apparatus 10 is fit in a manner encircling the circumference of the head. Moreover, because main apparatus 10 has a rounded form overall, it is safe if the viewer collides individually or with someone else.

As shown in FIGS. 2(a) and (b), optical apparatus 4 for showing images to the viewer when main apparatus 10 is on the head is provided inside front cover 2. Cable 11 connected to an external image apparatus is obtained from optical apparatus 4 at a position in main apparatus 10 corresponding to one side of the head for the purpose of inputting a video signal through a drive circuit.

(Structure of the Front Cover and the Occipital Region Support Cover)

In FIG. 2 and FIG. 3, the main part of front cover 2 comprises upper case 21 covering the front of the eyes and the sides of the head with the side member extended to a position covering the ears when main apparatus 10 is worn on the head; at the top of upper case 21, frontal region support cover 22 (the frontal region support member) extends on a slope following the shape of the frontal region towards the back. Pad support plate 23 is provided on the inside of frontal region support cover 22, and buffer pad 221 is affixed to the inside surface of this pad support plate 23. This buffer pad 221 becomes frontal region contact member 220 contacting the frontal region when main apparatus 10 is worn. It is to be noted that buffer pad 221 is replaceable because it is affixed to pad support plate 23 by a velcro-like material. It is therefore possible to keep the part touching the head sanitary.

Furthermore, main apparatus 10 can be worn easily even with eyeglasses on because there is a space with room between-the face and main apparatus 10. In addition, the eyeglasses do not fog up, and user comfort is excellent, because air is not trapped inside. Moreover, even with such a space provided, main apparatus 10 is resistant to slipping down because frontal region support cover 22 is sloped to the back along the shape of the frontal region.

Lower case 25 is attached at the inside of upper case 21, and the part separated by lower case 25 and upper case 21 forms optical system housing space in which optical apparatus 4 is provided.

Lower case 25 comprises front member 251 extending forward; divider 252 standing perpendicular to this front member 251; and side member 253 provided on the side at a perpendicular angle to this divider 252; housing portion of the optical system 20 housing optical apparatus 4 is separated from the exterior by front member 251 and divider 252. A pair of right and left windows 291 are formed at positions corresponding to the eyes in divider 252; recess 292 for avoiding contact with the nose on the inside is formed recessed to the front between windows 291. It is to be noted that front member 251 becomes the reference surface for positioning optical unit 40, described below. The inside surface of upper case 21 also becomes a reference surface for positioning optical unit 40. Note that a spring or other pressing means may be provided in any of the gaps between the inside surface of front member 251, optical unit 40, and upper case 21 to press optical unit 40 against the reference surface, and thereby improve the positioning precision.

With the present embodiment as described above, there is no oppressive sensation when main apparatus 10 is worn on the head because the nose does not contact main apparatus 10, and the freedom of use is improved because, for example, facial make-up will not be disturbed when the apparatus is used by women. Furthermore, a pair of elongated holes 485 on right and left is formed in front member 251.

A semi-transparent shade cover 26 of an acrylic resin is provided at the bottom of lower case 25 for an improved design. As shown in FIGS. 4(a) and (b), this shade cover 26 prevents the entry of light from below main apparatus 10 at the bottom of lower case 25. In addition, the width of shade cover 26 is the minimum required width whereby the area around the feet can be seen from gap 260 between the face and shade cover 26 with main apparatus 10 worn on the head.

Again, in FIG. 3, two holes 254 each are formed in the right and left side member 253 in lower case 25. Corresponding to these, threaded holes (not shown in the figures) are formed in upper case 21 at positions corresponding to holes 254, and screws (not shown in the figures) are threaded from the inside through holes 254 into the threaded holes in upper case 21 to fasten upper case 21 and lower case 25. Holes 261 are also formed in the right and left ends of shade cover 26. Corresponding to these, threaded holes (not shown in the figures) are formed in upper case 21 at positions corresponding to holes 261, and screws (not shown in the figures) are threaded from the inside through holes 261 into the threaded holes in upper case 21 to fasten upper case 21 and shade cover 26.

Front cover 2 and occipital region support cover 3 are connected at the parts positioned beside the ears when main apparatus 10 is worn on the head, and round speakers 6 are fastened in these connecting members 5 on right and left. Ventilation holes 281 are formed in ends 20 of front cover 2 positioned outside speakers 6, and the inside and outside of main apparatus 10 are connected around these ventilation holes 281 by connecting members 5. As a result, there is no feeling of insecurity, and safety in times of emergency is improved, because external sounds will reach the viewer through ventilation holes 281 even when speakers 6 are fit tightly to the ears of the viewer.

(Structure of the Connecting Members)

Of connecting members 5 for front cover 2 and occipital region support cover 3, the structure of the left side connecting member 5 as seen from the back of the apparatus is shown in FIG. 5. In speakers 6, the ring-shaped frame member 62 enclosing speaker plane 61 is made of a rigid plastic; frame member 62 also comprises a round flange member 63 projecting to the outside. A ring-shaped mating member 201 is provided projecting to the inside on the inside surface of end 20 of front cover 2. A round hole 301 is formed in end 30 of occipital region support cover 3. As a result, front cover 2 and occipital region support cover 3 are connected by fitting flange member 63 of speaker 6 inside mating member 201 with mating member 201 of front cover 2 fit into hole 301 of occipital region support cover 3. Thus, as shown in FIG. 6, using flange member 63 of speaker 6 as the axis of rotation in connecting member 5, it is possible to rotate occipital region support cover 3 up and down relative to front cover 2, and the position of occipital region support cover 3 can be changed to the position of greatest user comfort. Moreover, as shown in FIG. 7(a), it is also possible to rotate occipital region support cover 3 in the direction of arrow A or arrow B to fold occipital region support cover 3 completely into front cover 2 and make main apparatus 10 more compact for storage or transportation. In addition, when the viewer lies down with head-mounted image display apparatus 1 worn on the head, occipital region support cover 3 becomes an obstacle to comfort if it is in the occipital region; therefore, if occipital region support cover 3 is raised to the top and used at an angle as shown in FIG. 7(b), the occipital region becomes open and viewing images can be enjoyed while lying down. Furthermore, because front cover 2 does not rotate, unlike occipital region support cover 3, if antenna 111 is fixed to the side of front cover 2 when the video signals are input to optical unit 40 by wireless transmission, antenna 111 will not get in the way because it is always vertical at the side of the head.

Moreover, using the rotating mechanism of connecting members 5 for front cover 2 and occipital region support cover 3, it is also possible to provide a narrow support band 39 that will rotate from the top edge of occipital region support cover 3 to a position above the top of the head to prevent the main apparatus from slipping off the head. Even in this condition nearly all parts of the top of the head are open, and there is no loss of user comfort.

Also using the rotating mechanism of connecting members 5 for front cover 2 and occipital region support cover 3, it is possible to form elongated hole 115 in end 20 of front cover 2, and draw cable 11 from elongated hole 115 as shown in FIGS. 8(a) and (b). By means of this configuration, the direction in which cable 11 is extended changes along elongated hole 115, and by pulling cable 11 out toward the back, main apparatus 10 can be rested on a table or other surface in a stable condition undisturbed by cable 11.

(Mechanism for Securing the Main Apparatus to the Head)

Because a head-mounted image display apparatus 1 thus comprised is used with main apparatus 10 mounted to the head, it is necessary to prevent main apparatus 10 from falling off the head when the head is moved during use of head-mounted image display apparatus 1. In addition, because optical apparatus 4 is integrated into main apparatus 10, it is necessary to secure main apparatus 10 to the head in a stable condition so that the weight of optical apparatus 4 does not cause fatigue or discomfort to the viewer. Moreover, it is necessary to secure main apparatus 10 to maintain a stable relationship between the positions of the optical apparatuses 4 built in to main apparatus 10, and positions of the viewer's eyes.

Therefore, the structure shown in FIG. 9 is used as the structure (securing means) preventing shifting relative to the head in the present embodiment. Note that FIG. 9 shows antenna 111 for inputting the video signal in the vertical position.

With the position slipping prevention structure of the present embodiment, a rubber air bag 8 is applied along the inside surface of occipital region support cover 3, and this air bag 8 is positioned in the occipital region when main apparatus 10 is worn on the head. An air tube 81 passes from air bag 8 through occipital region support cover 3, and valve 82 is attached to the end of air tube 81. As a result, by supplying compressed air through air tube 81 to air bag 8 using a rubber pump 83 or other means after the viewer puts main apparatus 10 on the head, the frontal region is pushed relatively toward frontal region support cover 22 of main apparatus 10, and main apparatus 10 can be fit to the head. In this condition, the surface on the inside side of air bag 8 becomes occipital region contact member 80. There is no discomfort in this condition because the frontal region is pressed against buffer pad 221 of frontal region support cover 22. Note that to remove main apparatus 10 from the head, air bag 8 is deflated by simply bleeding the air from air bag 8, and main apparatus 10 can be easily removed.

Note, also, that a motor-powered pump may be built in to main apparatus 10 to supply air to air bag 8 rather than using a rubber pump 83 that is separate from main apparatus 10. In this case, the front-back weight balance of main apparatus 10 can be improved by providing the motor-powered pump in occipital region support cover 3 to the side of air bag 8. In addition, the path from the pump to air bag 8 can be shortened, providing the added benefit of a simplified structure.

Because head-mounted image display apparatus 1 of this embodiment is structured such that main apparatus 10 is pushed to the head in the front-back position, main apparatus 10 will not shift in the direction of either arrow C or arrow D in FIG. 9. Therefore, user comfort is excellent because main apparatus 10 is stable when worn. Moreover, because the head contacts buffer pad 221 and air bag 8, strong impacts are not transferred to the head even if main apparatus 10 strikes a wall or other object when main apparatus 10 is worn on the head.

Furthermore, because the viewer can, for example, inflate air bag 8 whether air bag 8 is positioned directly behind the occipital region as shown in FIG. 10(a) or slightly below the occipital region as shown in FIG. 10(b) according to the size and shape of the head, and main apparatus 10 remains pressed against the head in the front-back direction, main apparatus 10 remains stable when worn on the head irrespective of the shape and size of the viewer's head.

(Optical Apparatus)

The basic structure of optical apparatus 4, and the basic principle of head-mounted image display apparatus 1 are described next with reference to FIG. 11.

In FIG. 11, optical apparatus 4 comprises a pair of liquid crystal display elements 42 (image display means, liquid crystal light valves) as right and left image display apparatuses; backlights 43 (lighting means) for illuminating these from the back; and enlarging lenses 45 (enlarging means; convex lenses) placed between these liquid crystal display elements 42 and the viewer's eyes. Note that relative to enlarging lenses 45, liquid crystal display elements 42 are provided on the side toward enlarging lenses 45 rather than the subject-side focal points 45a. In addition, the viewer's eyes are positioned near the image-side focal points 45b of enlarging lenses 45. Therefore, when main apparatus 10 is worn on the head, an image is displayed in liquid crystal display elements 42, and these are illuminated by backlights 43, the images are respectively focused for the right and left eyes by enlarging lenses 45, and the virtual images can be viewed. At this time the images seen by the eyes are fused by the brain and the image is viewed. For optical apparatus 4 of this configuration, optical apparatus 4 comprises a pair of right and left angular optical units 40 as shown in FIG. 2 and FIG. 3, and a flexible circuit board 41 extends to the sides from these optical units 40. The drive circuit for driving the display operations of liquid crystal display elements 42 are comprised in this flexible circuit board 41, and image signals are input to this drive circuit through cable 11 or antenna 111.

As further shown in FIG. 12, reflecting mirror 44 is provided between liquid crystal display element 42 and enlarging lens 45 on the optical axis L thereof in this embodiment to bend the optical axis L. As a result, liquid crystal display element 42 and enlarging lens 45 are provided three-dimensionally with liquid crystal display element 42 and backlight 43 provided above reflecting mirror 44. Moreover, optical units 40 are elongated rectangular parallelepipeds, each efficiently provided inside front case 2 so that front case 2 does not extend too far to the front. It is to be noted that if reflecting mirror 44 is positioned in the middle of the optical axis L of optical unit 40, it may be provided at any such position; the direction in which optical axis L is bent is also not limited.

Furthermore, as shown in FIG. 13, housing 400 of optical unit 40 is open at the top thereof so that heat generated by backlight 43 does not build up inside optical unit 40. In addition, the top opening is directed towards ventilation holes 282 in front cover 2 so that the heat generated by backlight 43 escapes to the outside. Moreover, if main apparatus 10 is worn on the head with the viewer wearing eyeglasses, the eyeglasses will not fog up because ventilation holes 283 are also formed in the connecting parts of upper case 21 and frontal region support cover 22, and air flow in the direction of arrow F is possible.

Moreover, the right and left optical units 40 are positioned such that optical axes L form an angle of depression $\Theta_1$ relative to the horizontal line of vision P of the eyes; FIG. 14(a) is a conceptual diagram for the case in which reflecting mirror 44 is not used, and FIG. 14(b) is a conceptual diagram for the case in which reflecting mirror 44 is used. The reason for this is to reduce the burden on the eyelids when the viewer watches virtual image V on liquid crystal display elements 42 enlarged by enlarging lenses 45 in head-mounted image display apparatus 1 of the present embodiment. More specifically, the results of a study of the relationship between the angle formed by the line of vision to the horizontal line of vision P, and the relative burden on the eyelids when the viewer's line of vision is directed to the front, subjectively evaluated by fifty males and females ranging in age from 20 years to 45 years, are shown in Table 1.

TABLE 1

| Angle | Evaluation result |
|---|---|
| $-5° < \Theta_1 < 0°$ | Heavy burden |
| $0° \ \Theta_1 = 6°$ | Extremely light burden |
| $6° < \Theta_1 = 10°$ | Light burden |

As shown in Table 1, when the test subjects viewed virtual images at a position above the horizontal line of vision P, there was a sensation of the eyelids being forced open, and the burden on the eyelids was felt to be heavy. However, when the virtual images V were viewed at a position below the horizontal line of vision P, the opening of the eyelids felt natural, and the sense of burden was small. Moreover, this angle was concluded to preferably be in the range from 0° to 10°. Therefore, in the present embodiment, optical axis L is provided to form an angle of depression to the horizontal line of vision of 10° or less, and is, in particular, positioned to form an angle of 6° or less. It is to be noted that an angle of depression up to approximately 15° was confirmed to reduce the sense of burden on the eyelids.

In forming this angle, optical units 40 are offset to a slightly downward position, and enlarging lenses 45 are provided at an upward angle in the present embodiment.

(Diopter Adjustment Mechanism and the Adjustment Mechanism in the Pupil Distance Direction of the Optical Apparatus)

To unitize optical apparatus 4, the optical unit is comprised as shown in FIG. 15 and FIG. 16 in this embodiment.

In optical unit 40, image display unit 46, reflecting mirror 44, and enlarging lens 45 are provided in a basically box-shaped housing 400 made of resin, etc. More specifically, housing 400 has openings 451 and 452 formed at top and front, and enlarging lens 45 is fit into opening 452. At about the center of housing 400 in the height direction, image display unit 46 is disposed facing opening 451; in this image display unit 46, backlight 43 and liquid crystal display element 42 are disposed inside square-shaped frame 461, vertically in which opening 466 is formed, as shown in FIG. 16.

Projections 464 and 465, which are semicircular in cross section, are formed in a vertical direction on two exterior sides of frame 461, and female thread 466 is formed in one projection 464.

Referring again to FIG. 15, projections 453 and 454 are formed in a vertical direction on two exterior sides of housing 400 with guide channels 456 and 457, respectively, having a semicircular opening in cross section formed therein. Image display unit 46 is housed inside housing 400 with projections 464 and 465 of frame 461 fit in these guide channels 456 and 457. Note here that because the internal diameter dimension of guide channels 456 and 457 is slightly greater than the outside diameter dimension of projection 464 of image display unit 46, image display unit 46 can move vertically guided by guide channels 456 and 457.

In addition, seat member 455 in which support hole 470 is formed is formed at a position above one projection 453 in housing 400. Diopter adjustment feed screw 458 is supported so that it can be turned in support hole 470; the end of this diopter adjustment feed screw 458 is engaged with female thread 466 of image display unit 46. As a result, when diopter adjustment knob 459 attached to the top end of diopter adjustment feed screw 458 is turned, image display unit 46 is raised or lowered along the optical axis L, enabling the vertical position of liquid crystal display element 42, i.e., the optical distance between liquid crystal display element 42 and enlarging lens 45, to be adjusted according to the visual acuity of the viewer. In addition, because liquid crystal display element 42 is moved together with backlight 43 as image display unit 46 in this embodiment, the distance between liquid crystal display element 42 and backlight 43 remains constant. Diopter adjustment mechanism 47 (the axial position adjustment mechanism) is thus comprised in the present embodiment.

Even when a diopter adjustment is made according to the visual acuity of the viewer by means of this diopter adjustment mechanism 47, there is no change in luminance even though the viewer changes because the distance between liquid crystal display element 42 and backlight 43 remains constant. Furthermore, even if there is a difference in right and left visual acuity, there is no difference in luminance.

In addition, racks 481 project to the side from the right and left housings 400 in mutually opposing directions and parallel to each other; a pinion 482 meshes with these racks 481. Therefore, when pupil distance position adjustment knob 483 attached to the top of pinion 482 is turned, the rotation thereof can move the pair of housings 400 mutually apart or mutually together. During this movement, the drive circuit electrically connected to optical units 40 also moves, but because this drive circuit is comprised of a flexible circuit board 41 as shown in FIG. 3, a great burden is not applied to the drive circuit.

With the pupil distance position adjustment mechanism 48 thus comprised, handling is simple because both housings 400 are moved by one pinion 482. In addition, because the right and left optical units 40 move symmetrically by an equal distance, the center position between the pair of housings 400 is fixed to a constant position, and both eyes can be simply and simultaneously adjusted.

In pupil distance position adjustment mechanism 48 and diopter adjustment mechanism 47 thus comprised, pupil distance position adjustment knob 483 and diopter adjustment knobs 459 are both positioned at the top of front cover 2 as shown in FIG. 17. Of these knobs, diopter adjustment knobs 459 slide horizontally when pupil distance position adjustment knob 483 is operated; as a result, by forming elongated holes 484 in front cover 2, diopter adjustment knobs 459 and diopter adjustment feed screws 458 can move horizontally. In addition, elongated holes 485 are also formed in the bottom of front cover 2 corresponding to elongated holes 484; positioning pins 469 projecting downward from the bottom of the pair of housing 400 are fit inside elongated holes 485, forming a guide mechanism. Elongated holes 485 and positioning pins 469 also prevent optical units 40 from turning and the optical axis L shifting. The same is also true of elongated holes 484 and diopter adjustment feed screws 458.

Because pupil distance position adjustment knob 483 and diopter adjustment knobs 459 are both provided grouped on the top of front cover 2 as described above, operation is simple even if these knobs cannot be seen. Furthermore, when main apparatus 10 is assembled, optical units 40 and flexible circuit board 41 are first assembled into upper case 21, and then lower case 25 is attached to upper case 21. While all parts are opaque, the formation of elongated holes 485 in lower case 25 makes it possible and more convenient to fit positioning pins 469 into elongated holes 485 while peeking through these holes.

It is to be noted that in FIG. 17, flexible circuit board 41 and a circuit block are provided to the sides of optical units 40, and these comprise the liquid crystal display element drive circuits, backlight drive circuits, battery, TV tuner, etc.

(An Improved Embodiment of the Optical Apparatus)

It is to be noted that with optical apparatus 4 shown in FIG. 15 optical units 40 are provided so that the optical axes L of the right and left optical units 40 are parallel, but as shown in FIG. 18 it is preferable to converge lines extended forward on the optical axes L so that they intersect to form an angle of convergence $\Theta_2$ of approximately 3°. More specifically, the natural line of vision for humans during vigilance normally forms an angle of convergence $\Theta_2$ to the inside, and the present embodiment therefore biases each of the optical units 40 1.5° so that the optical axes L form an approximately 3° angle of convergence $\Theta_2$. As a result, there is no sense of fatigue because the viewer can easily fuse the images obtained by the right and left eyes.

For the purpose of achieving such a construction, the right and left optical units 40 are biased slightly to the outside, and racks 481 from the sides of housings 400 are formed at an angle as shown in FIG. 19. As a result, because racks 481 are mutually opposed and parallel, pupil distance position adjustment mechanism 48 can be operated by a single pinion 482. Furthermore, adjustment of the position in the pupil distance direction, and visual acuity adjustment, can be accomplished while holding an approximately 3° angle of convergence.

(Construction of the Liquid Crystal Display Apparatus)

Because a pair of right and left liquid crystal display modules 420 are provided as liquid crystal display element 42, it is necessary to provide these liquid crystal display modules 420 so they do not collide. The various dimensions are therefore defined in the present embodiment in FIG. 20 treating the optical axes L as parallel even through the optical axes L of optical units 40 form an approximately 30° angle of convergence $\Theta_2$.

First, assuming the horizontal width of liquid crystal display modules 420 to be dimension $W_1$ (mm), and the center-center distance of the right and left liquid crystal display elements 42 to be dimension G (mm), the dimensions are set to satisfy the following equation:

$$W_1 < G.$$

While the pupil distance in humans varies according to the individual, age, race, and other factors, the minimum value may be considered to be approximately 55 mm. This is because the average pupil distance in children was determined as the result of various surveys to be approximately 55 mm. Therefore, dimension G (mm), the center-center distance of the liquid crystal display elements, is defined to be 55 mm, and liquid crystal display modules 420 narrower than this dimension are used. It is to be noted that liquid crystal display modules 420 comprise liquid crystal display element 42 and a mounting substrate for mounting liquid crystal display element 42, and the horizontal width of the mounting substrate is generally greater than the horizontal width of the image display surface by approximately 10 mm to approximately 15 mm. Furthermore, a divider may also be inserted between the optical units 40 for the right and left eyes to avoid interference between the images on the opposite sides. Therefore, when the horizontal dimension of the image display surface of the liquid crystal display element 42 exceeds 40 mm, i.e., when the diagonal dimension of the image display surface exceeds 2.0 inches in an NTSC format liquid crystal display element, addressing problems caused by contact between the liquid crystal display modules occur; in the present embodiment, therefore, liquid crystal display modules 420 in which the diagonal dimension of the image display surface is 2.0 inches or less are used in NTSC format liquid crystal display elements in which the horizontal dimension of the image display surface of the liquid crystal display element 42 is 40 mm.

Because the relationship between image quality and the number of pixels is subjective, the relationship between the number of pixels and image quality was surveyed using a subjective evaluation method; it was confirmed that substantially satisfactory image quality can be obtained if the number of pixels is 170,000 or greater, and that approximately 300,000 or more pixels are required to feel that image quality is high. To obtain this number of pixels with an NTSC format liquid crystal display element, the following equations must be satisfied where the horizontal width of the image display surface is dimension $W_2$ (mm), and the pixel pitch is P (mm):

if the number of pixels is 170,000 or more: $P=0.0021 \times W_2$, if the number of pixels is 300,000 or more: $P=0.0016 \times W_2$.

In the aforementioned survey, it was also confirmed that a horizontal view angle of 30° or greater is necessary to obtain a sufficient sense of presence in the image, and the horizontal view angle is therefore set to 30° or greater.

Moreover, because enlarging lens 45 in the present embodiment is a single aspheric lens, the pixel pitch dimension P is set to satisfy the following equation:

$$P = 30 \times 10^{-3}.$$

Specifically, distortion is suppressed to within ±2% to prevent distortion with a single aspheric lens from being obvious to the viewer; to assure an MTF of 0.1 or greater to obtain a clear display image from corner to corner, the spatial frequency of liquid crystal display element 42 must be held to 17 lines/mm, and the pixel pitch of liquid crystal display element 42 is 30 µm or greater.

The conditions for simultaneously resolving the problems of addressing and image quality described above are in the shaded area of FIG. 21, which shows the relationship between the diagonal size of the image display surface of the liquid crystal display element (axis of abscissas) and the pixel pitch (axis of ordinates).

In this figure, dotted line 101 is the boundary of the following equation for 170,000 pixels.

$$P = 0.021 \times W_2$$

Moreover, dotted line 102 is the boundary of the following equation for 300,000 pixels.

$$P = 0.016 \times W_2$$

Dotted line 103 is the boundary of the following equation.

$$W_1 < 55 \text{ i.e. } W_2 < 40$$

Dotted line 104 is the boundary of the following equation.

$$P = 30 \times 10^{-3}$$

Therefore, the conditions of liquid crystal display elements 42 used in the present embodiment are set to the shaded area bounded by a, b, c, and d in the figure when the number of pixels is 170,000, and to the shaded area bounded by f, e, and c when the number of pixels is 300,000. Thus, liquid crystal display elements 42 in which the diagonal size of the image display surface is from approximately 1.0 inch to approximately 2.0 inches with 170,000 pixels or more are used.

For example, the configurations obtaining an enlarged virtual image with a horizontal view angle of 30° using liquid crystal display elements 42 with a 1.32-inch diagonal measurement are as follow.

With this configuration, liquid crystal display element 42 is illuminated from the back by backlight 43, and the displayed image is enlarged by a single aspheric lens for viewing. In liquid crystal display element 42, the diagonal size is 1.32 inches with a 4:3 aspect ratio; there are 300,000 pixels (640 horizontal×480 vertical); the pixel pitch is 42 μm horizontal×42 μm vertical; and the aperture ratio is 29.5%. Enlarging lens 45 (aspheric surface convex lens) has a focal length of 48.46 mm and a magnification ratio of 5.16 times. The two surfaces ($S_1$, $S_2$) of enlarging lens 45 are both aspheric surfaces, the shape of which is expressed by the following equation yielding the aspheric surface sag.

$$Y = \frac{CR^2}{1 + \{1 - (K+1)C^2R^2\}^{1/2}} + AR^4 + BR^6 \ldots$$

where C is the curvature of the vertex of each surface; R is the height from the optical axis L; K is a parameter of the conic section; and A and B are aspheric surface coefficients.

In the present embodiment, the center thickness of the lens was obtained for each lens shown in Table 2. It is to be noted that in each case the refractive index $n_d$ of the lens is 1.49154. In addition, the distance between the viewer's eye and the vertex of surface $S_1$ of the enlarging lens (aspheric surface convex lens) is set to 20.0 mm~35.0 mm.

TABLE 2

| Sample number | | Radius of curvature (mm) | K | A × 10$^{-4}$ | B × 10$^{-7}$ | Lens center thickness (mm) |
|---|---|---|---|---|---|---|
| 1 | $S_1$ | 121.15 | 28.16 | 0.29 | −1.60 | 9.3 |
|   | $S_2$ | −29.04 | −3.59 | 0.10 | −0.17 |  |
| 2 | $S_1$ | 53.25 | 5.97 | 0.28 | −0.61 | 9.8 |
|   | $S_2$ | −40.77 | −7.28 | 0.20 | −0.30 |  |
| 3 | $S_1$ | 64.61 | 10.28 | 0.32 | −0.59 | 8.3 |
|   | $S_2$ | −36.36 | −5.96 | 0.21 | −0.38 |  |

Here, the distance between the eye and the vertex of surface $S_1$ of enlarging lens 45 (aspheric surface convex lens) must be set using the width because of individual differences. Moreover, for a person wearing eyeglasses, a distance of at least 20 mm must be assured to enable use without removing the glasses.

In a head-mounted image display apparatus 1 thus defined, the weight is 280 g, the distance of the projection from the face forward is 48 mm, and wearability was confirmed to be good in all cases. That a weight reduction was achieved while a 1.32-inch liquid crystal display element 42 is used here is because the enlargement optics comprise a single lens made of plastic.

Furthermore, the aperture ratio of liquid crystal display element 42 is approximately 29.5% despite using a high resolution display element having 300,000 pixels. Therefore, a brightness of approximately 24 cd/m² can be assured, and is sufficiently bright for viewing high resolution images.

Furthermore, in addition to the number of pixels of liquid crystal display element 42 being high, the performance of the enlarging lens matches; as a result, the image quality of the enlarged display image is free of distortion and is clear from corner to corner. Moreover, the enlarging lens used suppresses distortion to within ±2% because it has aspheric surfaces, and there is therefore no image distortion. In addition, the spatial frequency obtained from the pixel pitch of liquid crystal display element 42 is 12 lines/mm, but because the MTF of the 12 lines/mm spatial frequency is 0.18 in the maximum horizontal view angle, sufficient resolution can be obtained.

Furthermore, because enlarging lens 45 of the present embodiment can be manufactured with good precision by plastic injection molding, this also contributes to higher image quality. Moreover, because throughput is high during production, the cost can be reduced.

For example, when compared with the use of a liquid crystal display element measuring 0.7 inch diagonally (for comparison), as shown in Table 3, the brightness of this comparison liquid crystal display element is approximately 4 cd/m² because an aperture ratio of only 5% can be assured, and high resolution images can therefore not be viewed.

TABLE 3

| Display element size | Brightness | MTF of maximum horizontal view angle | Ease of diopter adjustment |
|---|---|---|---|
| Embodiment: 1.32 inches | 24 cd/m² | 0.18 | Good |
| Comparison: 0.7 inch | 4 cd/m² | <0.1 | Difficult |

Furthermore, in the comparison liquid crystal display element, the pixel pitch becomes 23 μm, requiring a resolution of 22 lines/mm in the enlarging lens. This is, therefore, not a condition whereby a single enlarging lens can provide sufficient resolution at the maximum horizontal view angle.

Moreover, to adjust in the range from −2.5D to 2.5D in the diopter adjustment, the front-back movement of the liquid crystal display element is approximately 10 mm when a 1.32-inch liquid crystal display element is used, and adjustment to the best position is simple. In a 0.7-inch liquid crystal display element, however, movement is approximately 4 mm for the same diopter adjustment, and fine adjustment is impossible.

It is to be noted that to view enlarged virtual images to a 35° horizontal view angle using the same 1.32-inch liquid crystal display element, enlarging lenses configured as shown in Table 4 may be used.

TABLE 4

| Sample number | | Radius of Curvature (mm) | K | A × 10$^{-4}$ | B × 10$^{-7}$ | Lens center thickness (mm) |
|---|---|---|---|---|---|---|
| 4 | $S_1$ | 56.00 | 5.43 | 0.24 | −0.60 | 12.31 |
|   | $S_2$ | −30.52 | −3.14 | 0.18 | −0.16 |  |
| 5 | $S_1$ | 84.00 | 8.44 | 0.24 | −0.97 | 12.17 |
|   | $S_2$ | −26.20 | −2.48 | 0.12 | −0.029 |  |
| 6 | $S_1$ | 105.00 | 16.62 | 0.25 | −1.30 | 12.25 |
|   | $S_2$ | −24.80 | −2.25 | 0.10 | −0.14 |  |

Table 4

In these cases, too, image quality and ease of diopter adjustment, etc. are superior when using liquid crystal display element 42 in the shaded area bounded by a, b, c, and d in FIG. 21 as described above compared with using liquid crystal display elements in the other areas.

The relationship between the size of liquid crystal display element 42 and the quality of the enlarged image when the enlargement optics comprise a single convex lens was also studied. For an objective evaluation of the enlarged image, the displayed image quality of liquid crystal display element 42 was assumed to be constant irrespective of size, and the comparison was based on the MTF value of the convex lens. However, the number of pixels of the liquid crystal display element was 300,000; the maximum horizontal view angle of the enlarged image is 30°; and the distortion of the convex lens was suppressed to within ±2% by using aspheric surfaces.

This relationship is shown in FIG. 22 as the relationship between the diagonal size of the image display surface of the liquid crystal display element and the MTF at the maximum horizontal view angle of the convex enlarging lens. It is to be noted that the spatial frequency M of the liquid crystal display element is a geometric value obtained from the pixel pitch P of the liquid crystal display element, and is obtained from the following equation:

$$M = \tfrac{1}{2} P \text{(lines/mm)}.$$

Therefore, a spatial frequency that is equivalent to the maximum spatial frequency of liquid crystal display element 42 and is greater than this in the enlarged image does not exist.

As will be known from this figure, if the diagonal size of the image display surface of liquid crystal display element 42 is smaller than 1.0 inch, the MTF is less than 0.1. Specifically, each pixel is no longer resolved, and significant image deterioration occurs. In addition, if the diagonal size of the liquid crystal display element is less than 1.0 inch, the matrix-shaped shade member stands out, there is the combined effect of the reduced MTF, and the viewer observes a significant deterioration in image quality.

However, if the diagonal size is 1.6 inches or greater, the MTF will exceed 0.3. However, when the MTF exceeds 0.3, virtually no difference will be discernible by the human eye if it becomes any greater. Therefore, at 1.6 inches or greater, it may be said that there is no difference in image quality. Conversely, if the diagonal size exceeds 2.0 inches, addressing problems develop, the overall size and weight of the head-mounted image display apparatus increase, and the wearability is impaired.

Therefore, because the diagonal size of the image display surface is set in the range from 1.0 inch to 2.0 inches while the enlargement optics are comprised of a single convex lens to reduce the size and weight of the overall apparatus, and liquid crystal display elements with a pixel pitch of 30 μm or greater and 170,000 pixels or more are used, the head-mounted image display apparatus of the present embodiment offers excellent image quality, operating characteristics, and wearability.

Embodiment 2

FIG. 23 is a descriptive drawing showing the position shifting prevention mechanism (securing means) provided in the main apparatus of a head-mounted image display apparatus according to a second embodiment of the present invention. In a head-mounted image display apparatus according to the present embodiment and according to the fifth embodiment described below, only the construction of the main apparatus differs, and the construction of the optical apparatus and other components is the same; the same reference numerals are therefore used for parts having the corresponding function, and further description thereof is omitted.

In FIG. 23, air bag 8a inside main apparatus 10 is inflated to secure the main apparatus to the head even in the head-mounted image display apparatus of the present embodiment. However, air bag 8a is provided across the entire inside surface of the main apparatus in this embodiment. As in the first embodiment, air tube 81 and valve 82 are provided for this air bag 8a. Therefore, if air is supplied from air tube 81 to air bag 8a when main apparatus 10 is worn on the head, air bag 8a inflates to the entire circumference of the head, and main apparatus 10 is held to the head in a stable condition. As a result, there is little sense of discomfort for the viewer when main apparatus 10 is worn on the head. Furthermore, because there is no shaking of main apparatus 10, the added benefit of being able to enjoy images with high image quality is obtained. It is to be noted that speakers 6 are provided in main apparatus 10, and air bag 8a is provided to avoid the locations of speakers 6.

Moreover, that part 80a of air bag 8a contacting the occipital region is made to inflate more in this embodiment so that the position of main apparatus 10 will not shift in the front-back direction of the head. Therefore, the relative positions of the eyes and optical units 40 can be reliably defined, and the same effects can be obtained as in the first embodiment.

It is to be noted that the position of air bag 8a shall not be limited to the entire circumference of the head, and the front-back position of the head and main apparatus 10 can be reliably controlled even if air bag 8a is provided only in the positions corresponding to the frontal region and the occipital region. Note, also, that air bag 8a may be provided only at the positions corresponding to the sides of the head.

Embodiment 3

FIG. 24 is a descriptive drawing showing the position shifting prevention mechanism (securing means) provided in the main apparatus of a head-mounted image display apparatus according to a third embodiment of the present invention.

In the head-mounted image display apparatus of the present embodiment as shown in FIG. 24, main apparatus 10 is mechanically secured to the head. Specifically, threaded hole 85 is formed in occipital region support cover 3 (the occipital region support member), and threaded shaft 86 is fit in threaded hole 85. A knob 861 is attached to the base end of threaded shaft 86, and an occipital region pad 862 is provided on the leading end. Occipital region pad 862 comprises back plate 863, which is shaped with a curve corresponding to the head, and a flexible body 864 (the occipital region contact member) of rubber, etc., applied to the surface of back plate 863.

Therefore, if knob 861 is turned in the direction threading threaded shaft 86 in after placing main apparatus 10 on the head with buffer pad 221 of main apparatus 10 contacting the frontal region, threaded shaft 86 pushes occipital region pad 862 against the head. As a result, the head becomes held between buffer pad 221 and occipital region pad 862, and main apparatus 10 is secured firmly to the head. Furthermore, because flexible body 864 contacts the occipital region, individual differences in the shape and size of the occipital region can be absorbed, and firm support obtained. Thus, because the main apparatus can be worn stably even if the head and body move, there is no sense of fatigue and discomfort. In addition, images with high image quality can be enjoyed.

It is to be noted that the fastening position and support position of the displacement mechanism of the occipital region support member using a feed screw as described above shall not be limited.

Embodiment 4

FIGS. 25(a) and (b) are descriptive drawings showing the position shifting prevention mechanism (securing means) provided in the main apparatus of a head-mounted image display apparatus according to a fifth embodiment of the present invention.

Main apparatus 10 is also mechanically secured to the head in the head-mounted image display apparatus of the present embodiment as shown in FIG. 25(a). Specifically, support arm 87 is formed from front cover 2 to the top of the head, and threaded hole 871 is formed in support arm 87. In occipital region support cover 3, elongated hole 872 is formed as shown in FIG. 25(b), and screw 873 with a knob is secured through elongated hole 872 in threaded hole 871. Furthermore, basically the same connecting structure shown in FIG. 5 is used in connecting members 5 of front cover 2 and occipital region support cover 3, but elongated hole 874 as shown in FIG. 25(a) is formed in place of round holes 301 in ends 30 of occipital region support cover 3.

Therefore, main apparatus 10 is first worn with buffer pad 221 of main apparatus 10 contacting the frontal region, and the line of vision position is adjusted. Then, if the margin of the overlap of support arm 87 and occipital region support cover 3 is adjusted when screw 873 is threaded into the threaded hole, the position of occipital region support cover 3 changes within the range of the length of elongated hole 872. Thus, because the inside diameter dimension in the front-back direction of main apparatus 10 is adjusted, main apparatus 10 can be worn stably on the head. In addition, there is no sense of discomfort or instability, and images with high image quality can be enjoyed.

It is to be noted that because occipital region pad 875 comprising rubber, a spring, or other flexible body is formed on the inside surface of occipital region support cover 3, discomfort is small because the occipital region is held in the front-back direction by occipital region pad 875.

Embodiment 5

In a connecting structure whereby mating members 201 projecting to the inside in ends 20 of front cover 2 are fit into holes 301 formed in ends 30 of occipital region support cover 3, and flange members 63 of speakers 6 are fit into mating members 201 projecting inside occipital region support cover 3, as shown in FIG. 5 and described in the first embodiment, a slide mechanism as shown in FIGS. 27(a) through (e) can be used to enable sliding from this condition until occipital region support cover 3 is housed inside front cover 2 as shown by the dotted line in FIG. 26.

Specifically, in FIG. 27(a), slide member 50 comprising mating member 201 is provided in end 20 of front cover 2. This slide member 50 comprises a pair of L-shaped claws 52 on the back side of mating member 201 as shown in FIGS. 27(b) and (c). These claws 52 are formed in mutually opposing vertical directions, and are able to flex vertically. A small projection 53 is also formed on each of claws 52. On end 20 of front cover 2, a slit 65 is formed extending front-back, and guide members 66 extend on both sides of slit 65 projecting to the outside of end 20 of front cover 2. Therefore, by fitting claws 52 into slit 65, slide member 50 can be installed to end 20 of front cover 2. In addition, because occipital region support cover 3 can move from the position shown in FIG. 27(a) to the position shown in FIG. 27(d) with end 30 held by end 20 of front cover 2 and speaker 6, occipital region support cover 3 can be drawn from the position indicated by the solid line in FIG. 26 to the position indicated by the dotted line, and occipital region support cover 3 can be housed in front cover 2.

As shown in FIG. 27(e), a hole 67 in which projection 53 enters is formed at a predetermined position in guide members 66. This is convenient for carrying because occipital region support cover 3 can be secured in front cover 2 with projection 53 fit in holes 67. Moreover, as shown in FIG. 27(c), because the vertices of projection 53 slide on the inside surface of guide members 66, occipital region support cover 3 can be slid easily relative to front cover 2.

APPLICATIONS IN INDUSTRY

As described hereinabove, the present invention comprises a frontal region support member and an occipital region support member provided in the main apparatus, and is characterized by an air bag or other means used in this occipital region support member to push the frontal region relatively forward, and thereby press the frontal region and the frontal region support member together. A sense of stability is therefore obtained when wearing the invention because the head can be positioned based on the frontal region support member of the main apparatus by means of the present invention. Furthermore, because the main apparatus does not shift even if the body or head is moved, a sense of weight is not felt from the main apparatus. Therefore, there is no sense of fatigue or discomfort. Moreover, because the relationship between the positions of the optical system and eyes can be controlled, there is no image blurring and the image quality can be improved.

Furthermore, when the image display apparatus and lighting means are combined as a single unit, and the unit is made movable along the optical axis in the present invention, there is no change in the relative positions of the image display apparatus and lighting means even if these are moved for diopter adjustment, and image quality therefore does not deteriorate. Furthermore, because diopter adjustment is possible by unit, consistent image quality can be enjoyed even if the visual acuity is different in right and left eyes. Moreover, because the image display apparatus and lighting means can be disposed in close proximity by combining them as a single unit, the lighting efficiency is high. As a result, image quality is not deteriorated by a low power consumption design.

Furthermore, because the right and left optical units move as one when the position in the pupil distance direction is adjusted, the center position between the optical units does not move. As a result, viewing from a position adjusted to the pupil distance is possible because both the relative distance between and the absolute positions of the optical units can be adjusted.

Moreover, when the optical axis is facing downward from the horizontal line of vision, image viewing can be enjoyed with a natural line of vision without burdening the eyelids, etc. Because there is therefore little fatigue, the viewer can obtain a strong sense of presence because the viewer can become immersed in the images.

Furthermore, size and weight can be reduced, and high image quality can be obtained, by using as the display apparatus a liquid crystal display element in which the diagonal size of the image display surface is 1.0~2.0 inches, the pixel pitch is 30 μm or greater, and the number of pixels is 170,000 or greater. Brightness, operability, and economy are also improved. In particular, high image quality can be obtained while achieving a compact, lightweight apparatus by comprising the enlarging means from a single enlarging lens.

What is claimed:

1. A head-mounted image display apparatus for mounting on a head of a user with eyes having a horizontal line of vision, the apparatus comprising:

an image display unit for forming an optical image;

an enlarging lens for focusing said optical image to the eyes;

said image display unit and said enlarging lens being positioned on an optical axis formed at an angle of depression relative to said eye's horizontal line of vision;

a diopter adjustment unit that moves said image display unit relative to said enlarging lens along said optical axis while maintaining said angle of depression of said optical axis relative to said eye's horizontal line of vision;

first and second image display units;

first and second enlarging lenses; and first and second diopter adjustment units, said first diopter adjustment unit operating independently of said second diopter adjustment unit to move said first display unit, and said second diopter adjustment unit operating independently of said first diopter adjustment unit to move said second display unit.

2. The head-mounted image display apparatus according to claim 1, wherein said angle of depression is 10° or less.

3. The head mounted image display apparatus according to claim 1, wherein said angle of depression is 6° or less.

* * * * *